United States Patent
Li et al.

(10) Patent No.: US 12,254,572 B2
(45) Date of Patent: Mar. 18, 2025

(54) FACIAL EXPRESSION EDITING METHOD AND ELECTRONIC DEVICE

(71) Applicant: Huawei Technologies Co., Ltd., Shenzhen (CN)

(72) Inventors: Zhaoyang Li, Beijing (CN); Xi Zhang, Hangzhou (CN); Qinqin He, Shenzhen (CN); Yinglu Zhang, Shenzhen (CN); Jiping Liao, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 152 days.

(21) Appl. No.: 18/073,992

(22) Filed: Dec. 2, 2022

(65) Prior Publication Data
US 2023/0107555 A1    Apr. 6, 2023

Related U.S. Application Data

(63) Continuation of application No. PCT/CN2021/073361, filed on Jan. 22, 2021.

(30) Foreign Application Priority Data

Jun. 5, 2020    (CN) .......................... 202010510988.1

(51) Int. Cl.
*G06T 19/00*    (2011.01)
*G06T 7/11*    (2017.01)
(Continued)

(52) U.S. Cl.
CPC ................ *G06T 19/00* (2013.01); *G06T 7/11* (2017.01); *G06T 7/60* (2013.01); *G06T 7/74* (2017.01);
(Continued)

(58) Field of Classification Search
CPC ... G06T 19/00; G06T 7/11; G06T 7/60; G06T 7/74; G06T 17/00; G06T 2200/24;
(Continued)

(56) References Cited

U.S. PATENT DOCUMENTS 9,799,096 B1    10/2017    De La Torre et al.
2014/0153832 A1    6/2014    Kwatra et al.
(Continued)

FOREIGN PATENT DOCUMENTS

CN    103473801 B    9/2016
CN    106056650 A    10/2016
(Continued)

OTHER PUBLICATIONS

Wissam J Baddar et al.: "Dynamics Transfer GAN: Generating Video by Transferring Arbitrary Temporal Dynamics from a Source Video to a Single Target Image," Dec. 10, 2017, XP080841580, 17 pages.
(Continued)

*Primary Examiner* — Jin Cheng Wang
(74) *Attorney, Agent, or Firm* — Conley Rose, P.C.

(57) ABSTRACT

A facial expression editing method includes obtaining a to-be-edited image, where the to-be-edited image includes a first face image of a user; obtaining, by using a camera, a first video stream including a second face image of the user; editing the first face image of the user in the to-be-edited image based on the second face image of the user in the first video stream to obtain an edited image, where a facial expression of the user in the edited image is associated with a facial expression of the user in the first video stream.

20 Claims, 10 Drawing Sheets

(51) Int. Cl.
  *G06T 7/60* (2017.01)
  *G06T 7/73* (2017.01)
  *G06T 17/00* (2006.01)
  *G06V 40/16* (2022.01)

(52) U.S. Cl.
  CPC ............ *G06T 17/00* (2013.01); *G06V 40/174* (2022.01); *G06T 2200/24* (2013.01); *G06T 2207/10016* (2013.01); *G06T 2207/20084* (2013.01); *G06T 2207/20221* (2013.01); *G06T 2207/30201* (2013.01)

(58) Field of Classification Search
  CPC . G06T 2207/10016; G06T 2207/20221; G06T 2207/3201; G06T 2219/2021; G06T 19/20; G06T 11/00; G06T 13/40; G06T 7/10; G06T 11/60; G06V 40/174; G06V 40/176; G06V 40/165
  See application file for complete search history.

(56) References Cited

U.S. PATENT DOCUMENTS

| | | |
|---|---|---|
| 2018/0068178 A1 | 3/2018 | Theobalt et al. |
| 2018/0114546 A1 | 4/2018 | Singhal et al. |
| 2018/0225882 A1 | 8/2018 | Varanasi et al. |
| 2018/0350030 A1* | 12/2018 | Simons ................. G06T 5/50 |
| 2019/0206101 A1* | 7/2019 | De La Torre .......... G06T 11/60 |
| 2020/0258206 A1* | 8/2020 | Shen ................. G06V 40/165 |
| 2020/0380682 A1 | 12/2020 | Gao |
| 2022/0343648 A1* | 10/2022 | Chen ................. G06V 40/174 |

FOREIGN PATENT DOCUMENTS

| | | |
|---|---|---|
| CN | 106920274 A | 7/2017 |
| CN | 106709975 B | 12/2017 |
| CN | 107610209 A | 1/2018 |
| CN | 108171770 A | 6/2018 |
| CN | 108288072 A | 7/2018 |
| CN | 108985241 A | 12/2018 |
| CN | 109816759 A | 5/2019 |
| CN | 109829959 A | 5/2019 |
| CN | 110163054 A | 8/2019 |
| CN | 111127378 A | 5/2020 |
| WO | 2020150689 A1 | 7/2020 |

OTHER PUBLICATIONS

Geng, Jiahao et al., "Warp-guided GANS for single-photo facial animation," ACM Transactions on Graphics (ToG), vol. 37, No. 6, Article 231, Published: Nov. 2018, Dec. 4, 2016, 13 pages.

* cited by examiner a　　　　　b　　　　　c　　　　　d a　　　　　b　　　　　c　　　　　d a　　　　　b　　　　　c　　　　　d

FACIAL EXPRESSION EDITING METHOD AND ELECTRONIC DEVICE

CROSS-REFERENCE TO RELATED APPLICATIONS

This is a continuation of International Patent Application No. PCT/CN2021/073361 filed on Jan. 22, 2021, which claims priority to Chinese Patent Application No. 202010510988.1 filed on Jun. 5, 2020. The disclosures of the aforementioned applications are hereby incorporated by reference in their entireties.

TECHNICAL FIELD

This disclosure relates to the field of image processing, and in particular, to a facial expression editing method and an electronic device.

BACKGROUND

With development of computer vision technologies, facial recognition, as a mature algorithm, is widely used in a plurality of security-related applications, such as personal identifier (ID) authentication, mobile phone unlocking, smart privacy, access control card swiping, and remote user authentication. However, the plurality of applications is merely security-oriented. In addition to security, facial recognition can provide a technical basis for effect optimization and technical assurance for preventing ethical issues for more face-related applications, to improve user experience and standardize users' use of emerging facial technologies.

As photographing functions of smartphones gradually become powerful, a beautification function is widely used in mobile phones, and various plug-in applications are launched. However, most of these applications use a face beautification method based on a two-dimensional (2D) facial feature, to adjust editing effect from perspectives of a color and a 2D facial contour. In recent years, as a camera that can capture depth information is applied to a mobile phone, a face beautification method based on a three-dimensional (3D) face is proposed. The method can modify a face shape in three dimensions, refine color beautification modification solutions for different face areas, and obtain more realistic effect by modifying a 3D face structure. Face beautification based on a 3D face heavily depends on the camera that can capture depth information. In addition, editing effect of the face beautification is limited to beautification of a color and a shape, and no expression is re-edited for a photographed image.

SUMMARY

Embodiments of this disclosure provide a facial expression editing method and an electronic device. This can re-edit a facial expression of a user in a static photo based on the user's face image captured by using a camera in real time, implement an expression re-editing function, achieve more realistic effect, and improve user experience.

According to a first aspect, an embodiment of this disclosure provides a facial expression editing method, including obtaining a to-be-edited image, where the to-be-edited image includes a first face image of a user, obtaining a first video stream including a second face image of the user, editing the first face image of the user in the to-be-edited image based on the second face image of the user in the first video stream to obtain a preliminarily edited image, where the preliminarily edited image includes a third face image of the user, obtaining a feature image based on the first face image of the user in the to-be-edited image, the third face image of the user in the preliminarily edited image, and the second face image of the user in the first video stream, where the feature image is an image including an eye and an oral cavity of the user, and fusing the feature image and the third face image of the user in the preliminarily edited image to obtain an edited image. The edited image includes a first facial expression of the user, the second face image includes a second facial expression of the user, and the first facial expression is associated with the second facial expression.

Optionally, the method may alternatively include displaying a to-be-edited image in a display interface of a first device, where the to-be-edited image includes a first face image of a user, receiving a first operation in the display interface of the first device, responding to the first operation, where the first operation is used to perform facial expression editing on the first face image of the user, and the first operation may include one or more of the following: sliding, tapping, dragging, and inputting. Obtaining a first video stream, where the first video stream includes a second face image of the user, obtaining a target image from the first video stream, where the target image includes a target expression of the user, editing the to-be-edited image based on the target image to obtain an edited image, where an expression of the user in the edited image is closer to the target expression of the user than a facial expression of the user in the to-be-edited image, and displaying the edited image in the display interface of the first device.

Optionally, the first video stream includes a plurality of frames of image. Editing the first face image of the user in the to-be-edited image based on the second face image of the user in the first video stream may be editing the first face image of the user in the to-be-edited image based on the second face image of the user in the plurality of frames of image in the first video stream. Each frame of image in the plurality of frames of image includes the second face image of the user. The plurality of frames of image can improve effect of editing the first face image of the user in the to-be-edited image based on the second face image.

Optionally, obtaining a first video stream including a second face image of the user may include obtaining, by using a camera, the first video stream including the second face image of the user, receiving the first video stream including the second face image of the user, or invoking the stored first video stream including the second face image of the user. The second face image of the user may be obtained in a plurality of ways, to improve user experience.

Optionally, the camera may be a front-facing camera. The user may independently edit the user's facial expression by using the front-facing camera without any additional help.

Optionally, the face image in this disclosure may be an image including all facial features or an image in which all facial features can be recognized by an electronic device, for example, a front face image, an image including some facial features (for example, a side face image), or an image of the front face image rotated by a specific angle.

Optionally, the feature image may include the image of the eye and the oral cavity of the user, and may further include an image of a part other than the eye and the oral cavity of the user, for example, an ear, a nose, or an eyebrow. Further, the image of the oral cavity may also be understood as an image of a mouth. The image of the oral cavity may be an oral cavity image in which the mouth is open, or may be an oral cavity image in which the mouth is closed.

This can implement beautification, re-edit a facial expression of the user in a static photo based on the user's face image captured by using a camera in real time, implement an expression re-editing function, achieve more realistic effect, make an improvement in current 2D/3D beautification that only changes a skin color and a face contour in the industry, and improve user experience.

With reference to the first aspect, that the first facial expression is associated with the second facial expression includes the following.

The first facial expression is the second facial expression. Alternatively, a mean square error between a first vector and a second vector is less than a first threshold. The first vector is a vector indicating the first facial expression, and the second vector is a vector indicating the second facial expression. Alternatively, a similarity between the first facial expression and the second facial expression is less than a second threshold.

Optionally, the first threshold may be 0.1, 0.2, 0.5, 0.7, or another value. The first threshold is 0.5. Optionally, the second threshold may be 0.7, 0.8, 0.85, 0.9, or another value.

With reference to any one of the first aspect and the possible implementations of the first aspect, editing the first face image of the user in the to-be-edited image based on the second face image of the user in the first video stream to obtain a preliminarily edited image includes determining a first target parameter based on the second face image of the user in the first video stream and the first face image of the user in the to-be-edited image, where the first target parameter is a vector describing a face shape of the user, determining a second target parameter, a third target parameter, and a fourth target parameter based on the first target parameter and the to-be-edited image, where the second target parameter indicates a size of a face of the user, the third target parameter indicates a rotation matrix or an Euler angle of a head posture of a 3D face of the user, and the fourth target parameter indicates a translation vector required when a 3D head of the user in a Cartesian coordinate system is mapped to an image coordinate system, determining a fifth target parameter based on the first target parameter and the second face image of the user in the first video stream, where the fifth target parameter is a vector describing a facial expression of the user in the first video stream, building a target face model based on the first target parameter, the second target parameter, the third target parameter, the fourth target parameter, and the fifth target parameter, and performing rendering and reconstruction on the target face model to obtain the preliminarily edited image.

With reference to any one of the first aspect and the possible implementations of the first aspect, the first video stream includes N images, where N is an integer greater than 1. Each of the N images includes the second face image of the user. Determining a first target parameter based on the second face image of the user in the first video stream and the first face image of the user in the to-be-edited image includes performing modeling on the second face image of the user in each of the N images to obtain a first parameter of each image, where the first parameter of each image is a vector describing a face shape of the user in each image, performing modeling on the first face image of the user in the to-be-edited image to obtain a second parameter of the to-be-edited image, where the second parameter is a vector describing a face shape of the user in the to-be-edited image, and determining the first target parameter based on the first parameter of each of the N images and the second parameter of the to-be-edited image.

A precise face model is built based on the to-be-edited image and the face image in the first video stream. A photo is re-edited based on the precise face model. Content that does not exist in an actual situation is not added to the photo. This can restore actual effect of the user's face, obtain an edited image of high quality, and resolve a problem of a low yield rate of a generated adversarial network.

With reference to any one of the first aspect and the possible implementations of the first aspect, obtaining a feature image based on the first face image of the user in the to-be-edited image, the third face image of the user in the preliminarily edited image, and the second face image of the user in the first video stream includes separately performing image segmentation on the first face image of the user in the to-be-edited image, the third face image of the user in the preliminarily edited image, and the second face image of the user in the first video stream, to obtain a first image, a second image, and a third image, where the first image is an image that is in the to-be-edited image and that includes the eye and the oral cavity of the user, the second image is an image that is in the preliminarily edited image and that includes the eye and the oral cavity of the user, and the third image is an image that is in the first video stream and that includes the eye and the oral cavity of the user, encoding a feature of the eye and the oral cavity in the first image, the second image, and the third image, to obtain a feature vector of the images of the eye and the oral cavity of the user, and generating the feature image based on the feature vector of the images of the eye and the oral cavity of the user.

With reference to any one of the first aspect and the possible implementations of the first aspect, before obtaining, by using a camera, the first video stream including the second face image of the user, the method in this disclosure further includes obtaining, by using the camera, a second video stream including a fourth face image of the user, extracting a facial feature from the fourth face image of the user in the second video stream to obtain a first facial feature, and extracting a facial feature from the first face image of the user in the to-be-edited image to obtain a second facial feature, and when the first facial feature matches the second facial feature, obtaining, by using the camera, the first video stream including the second face image of the user.

It is determined that the to-be-edited face image includes a face image of the user, so that the user is allowed to edit the face image only of the user, thereby avoiding ethical issues and public opinions.

With reference to any one of the first aspect and the possible implementations of the first aspect, the method in this disclosure further includes, when the camera is started to obtain the first video stream, determining whether to record a video of a facial expression editing process of the user, if it is determined that the video of the facial expression editing process of the user is recorded, storing a plurality of frames of image or all images in the video of the facial expression editing process of the user after obtaining the edited image, where the plurality of frames of image or all the images include the edited image, and if it is determined that the video of the facial expression editing process of the user is not recorded, storing the edited image after obtaining the edited image.

The plurality of frames of image in the video of the facial expression editing process of the user may be consecutive or non-consecutive frames of image.

As the video of the facial expression editing process of the user is stored, when viewing the video, the user can see beautification effect of a facial expression in a photo, and see unique effect in which everyone else in the photo remains unchanged and only the facial expression of the user is changing.

With reference to any one of the first aspect and the possible implementations of the first aspect, the method further includes displaying in real time the to-be-edited image, the first video stream, and an effect image obtained by editing the to-be-edited image in real time.

The user may view editing effect by displaying in real time the to-be-edited image, the first video stream, and the effect image obtained by editing the to-be-edited image in real time. The user may further determine, by viewing the first video stream, whether a currently shot face image of the user is satisfying. If the face image is unsatisfying, the user may adjust a head posture and a shooting angle in a timely manner.

According to a second aspect, an embodiment of this disclosure provides an electronic device, including an obtaining unit configured to obtain a to-be-edited image, where the to-be-edited image includes a first face image of a user, and obtain a first video stream including a second face image of the user, an editing unit configured to edit the first face image of the user in the to-be-edited image based on the second face image of the user in the first video stream to obtain a preliminarily edited image, where the preliminarily edited image includes a third face image of the user, a feature obtaining unit configured to obtain a feature image based on the first face image of the user in the to-be-edited image, the third face image of the user in the preliminarily edited image, and the second face image of the user in the first video stream, where the feature image is an image including an eye and an oral cavity of the user, and a fusion unit configured to fuse the feature image and the third face image of the user in the preliminarily edited image to obtain an edited image, where the edited image includes a first facial expression of the user, the second face image includes a second facial expression of the user, and the first facial expression is associated with the second facial expression.

This can implement beautification, re-edit a facial expression of the user in a static photo based on the user's face image captured by using a camera in real time, achieve more realistic effect, make an improvement in current 2D/3D beautification that only changes a skin color and a face contour in the industry, and improve user experience.

Optionally, the first video stream includes a plurality of frames of image. Editing the first face image of the user in the to-be-edited image based on the second face image of the user in the first video stream may be editing the first face image of the user in the to-be-edited image based on the second face image of the user in the plurality of frames of image in the first video stream. Each frame of image in the plurality of frames of image includes the second face image of the user. The plurality of frames of image can improve effect of editing the first face image of the user in the to-be-edited image based on the second face image.

Optionally, obtaining a first video stream including a second face image of the user may include obtaining, by using a camera, the first video stream including the second face image of the user, receiving the first video stream including the second face image of the user, or invoking the stored first video stream including the second face image of the user. The second face image of the user may be obtained in a plurality of ways, to improve user experience.

With reference to the second aspect, that the first facial expression is associated with the second facial expression includes the following.

The first facial expression is the second facial expression. Alternatively, a mean square error between a first vector and a second vector is less than a first threshold. The first vector is a vector indicating the first facial expression, and the second vector is a vector indicating the second facial expression. Alternatively, a similarity between the first facial expression and the second facial expression is less than a second threshold.

Optionally, the first threshold may be 0.1, 0.2, 0.5, 0.7, or another value. The first threshold is 0.5. Optionally, the second threshold may be 0.7, 0.8, 0.85, 0.9, or another value.

With reference to any one of the second aspect and the possible implementations of the second aspect, the editing unit is further configured to determine a first target parameter based on the second face image of the user in the first video stream and the first face image of the user in the to-be-edited image, where the first target parameter is a vector describing a face shape of the user, determine a second target parameter, a third target parameter, and a fourth target parameter based on the first target parameter and the to-be-edited image, where the second target parameter indicates a size of a face of the user, the third target parameter indicates a rotation matrix or an Euler angle of a head posture of a 3D face of the user, and the fourth target parameter indicates a translation vector required when a 3D head of the user in a Cartesian coordinate system is mapped to an image coordinate system, determine a fifth target parameter based on the first target parameter and the second face image of the user in the first video stream, where the fifth target parameter is a vector describing a facial expression of the user in the first video stream, build a target face model based on the first target parameter, the second target parameter, the third target parameter, the fourth target parameter, and the fifth target parameter, and perform rendering and reconstruction on the target face model to obtain the preliminarily edited image.

With reference to any one of the second aspect and the possible implementations of the second aspect, the first video stream includes N images, where N is an integer greater than 1. Each of the N images includes the second face image of the user. During determining the first target parameter based on the second face image of the user in the first video stream and the first face image of the user in the to-be-edited image, the editing unit is further configured to perform modeling on the second face image of the user in each of the N images to obtain a first parameter of each image, where the first parameter of each image is a vector describing a face shape of the user in each image, perform modeling on the first face image of the user in the to-be-edited image to obtain a second parameter of the to-be-edited image, where the second parameter is a vector describing a face shape of the user in the to-be-edited image, and determine the first target parameter based on the first parameter of each of the N images and the second parameter of the to-be-edited image.

A precise face model is built based on the to-be-edited image and the face image in the first video stream. A photo is re-edited based on the precise face model. Content that does not exist in an actual situation is not added to the photo. This can restore actual effect of the user's face, obtain an edited image of high quality, and resolve a problem of a low yield rate of a generated adversarial network.

With reference to any one of the second aspect and the possible implementations of the second aspect, the feature obtaining unit is further configured to separately perform image segmentation on the first face image of the user in the to-be-edited image, the third face image of the user in the preliminarily edited image, and the second face image of the user in the first video stream, to obtain a first image, a second image, and a third image, where the first image is an image that is in the to-be-edited image and that includes the eye and the oral cavity of the user, the second image is an image that is in the preliminarily edited image and that includes the eye and the oral cavity of the user, and the third image is an image that is in the first video stream and that includes the eye and the oral cavity of the user, encode a feature of the eye and the oral cavity in the first image, the second image, and the third image, to obtain a feature vector of the images of the eye and the oral cavity of the user, and generate the feature image based on the feature vector of the images of the eye and the oral cavity of the user.

With reference to any one of the second aspect and the possible implementations of the second aspect, before obtaining, by using the camera, the first video stream including the second face image of the user, the obtaining unit is further configured to obtain, by using the camera, a second video stream including a fourth face image of the user.

The electronic device further includes a feature extraction unit configured to extract a facial feature from the fourth face image of the user in the second video stream to obtain a first facial feature, and extract a facial feature from the first face image of the user in the to-be-edited image to obtain a second facial feature, and a determining unit configured to, when the first facial feature matches the second facial feature, obtain, by using the camera, the first video stream including the second face image of the user.

It is determined that the to-be-edited face image includes a face image of the user, so that the user is allowed to edit the face image only of the user, thereby avoiding ethical issues and public opinions. With reference to any one of the second aspect and the possible implementations of the second aspect, the electronic device further includes a judging unit configured to, when the camera is started to obtain the first video stream, determine whether to record a video of a facial expression editing process of the user, and a storage unit configured to, if the judging unit determines to record the video of the facial expression editing process of the user, store a plurality of frames of image or all images in the video of the facial expression editing process of the user after obtaining the edited image, where the plurality of frames of image or all the images include the edited image, or if the judging unit determines not to record the video of the facial expression editing process of the user, store the edited image after obtaining the edited image.

As the video of the facial expression editing process of the user is stored, when viewing the video, the user can see beautification effect of a facial expression in a photo, and see unique effect in which everyone else in the photo remains unchanged and only the facial expression of the user is changing.

With reference to any one of the second aspect and the possible implementations of the second aspect, the electronic device further includes a display unit configured to display in real time the to-be-edited image, the first video stream, and an effect image obtained by editing the to-be-edited image in real time.

The user may view editing effect by displaying in real time the to-be-edited image, the first video stream, and the effect image obtained by editing the to-be-edited image in real time. The user may further determine, by viewing the first video stream, whether a currently shot face image of the user is satisfying. If the face image is unsatisfying, the user may adjust a head posture and a shooting angle in a timely manner.

According to a third aspect, an embodiment of this disclosure provides an electronic device, including a touch-screen, a memory, and one or more processors. One or more programs are stored in the memory. When the one or more processors execute the one or more programs, the electronic device is enabled to implement some or all of the steps in the method according to the first aspect.

According to a fourth aspect, an embodiment of this disclosure provides a computer storage medium, including computer instructions. When the computer instructions are run on an electronic device, the electronic device is enabled to perform some or all of the method according to the first aspect.

According to a fifth aspect, an embodiment of this disclosure provides a computer program product. When the computer program product runs on a computer, the computer is enabled to perform some or all of the method according to the first aspect.

In the solutions in embodiments of this disclosure, the user can only re-edit, by using facial recognition, a facial expression of the user, thereby avoiding ethical issues and public opinions. The first face image of the user in the to-be-edited image is re-edited based on the second face image of the user in the first video stream obtained by using the camera. A precise face model is built based on the to-be-edited image and the face image in the first video stream. A photo is re-edited based on the precise face model. Content that does not exist in an actual situation is not added to the photo. This can restore actual effect of the user's face, assist in beautification on a face image of the user, re-edit a facial expression of the user in the static photo based on the user's face image captured by using the camera in real time, implement an expression re-editing function, achieve more realistic effect, make an improvement in current 2D/3D beautification that only changes a skin color and a face contour in the industry, and improve user experience.

It should be understood that any one of the foregoing possible implementations may be freely combined on a premise of not violating a natural law. Details are not described in this disclosure.

It should be understood that, descriptions of technical features, technical solutions, beneficial effect, or similar words in this disclosure do not imply that all features and advantages can be implemented in any individual embodiment. On the contrary, it may be understood that, the descriptions of the features or the beneficial effect mean that at least one embodiment includes a specific technical feature, technical solution, or beneficial effect. Therefore, the descriptions of the technical features, the technical solutions, or the beneficial effect in this specification may not necessarily be specific to a same embodiment. Further, the technical features, the technical solutions, and the beneficial effect described in embodiments may be combined in any proper manner. A person skilled in the art may understand that an embodiment may be implemented without one or more specific technical features or technical solutions, or beneficial effect in a specific embodiment. In other embodiments, additional technical features and beneficial effect may be further identified in a specific embodiment that does not reflect all embodiments.

BRIEF DESCRIPTION OF DRAWINGS

To describe the technical solutions in some embodiments of this disclosure more clearly, the following briefly describes the accompanying drawings for describing some embodiments. It is clear that the accompanying drawings in the following description show merely some embodiments of this disclosure, and a person of ordinary skill in the art may still derive other drawings from these accompanying drawings without creative efforts.

DESCRIPTION OF EMBODIMENTS

The following clearly describes technical solutions in embodiments of this disclosure in detail with reference to the accompanying drawings.

The terms such as "first" and "second" mentioned below are merely intended for description in some cases, and shall not be understood as an indication or implication of relative importance or implicit indication of a quantity of indicated technical features. Therefore, a feature limited by "first" or "second" may explicitly or implicitly include one or more features. In the descriptions of embodiments of this disclosure, unless otherwise specified, "a plurality of" means two or more.

The following describes an application scenario of this disclosure.

Figure 1A:
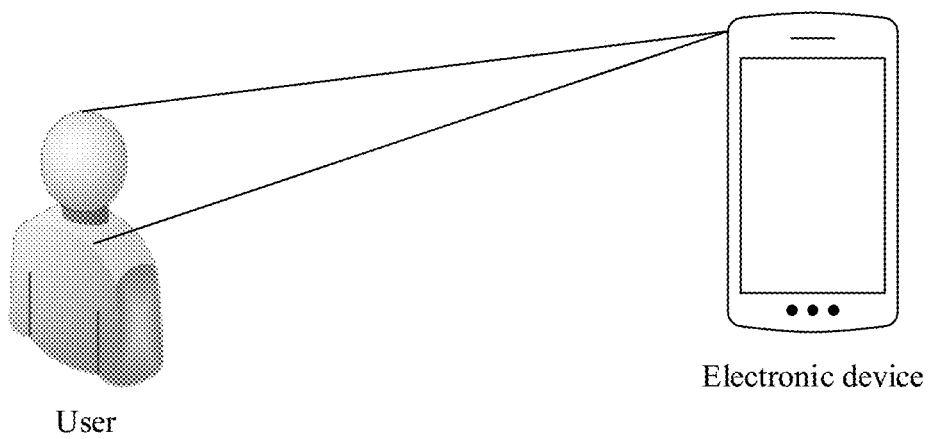
FIG. 1A is a schematic diagram of an application scenario according to an embodiment of this disclosure.

FIG. 1A is a schematic diagram of an application scenario according to an embodiment of this disclosure. As shown in FIG. 1A, when a user needs to edit an image that is stored in an electronic device and that includes a face image of the user, the electronic device obtains a to-be-edited image selected by the user. The to-be-edited image includes a first face image of the user. The electronic device obtains, by using a camera, a video stream including a second face image of the user, edits the first face image of the user in the to-be-edited image based on the second face image of the user in the obtained video stream to obtain an edited image. A facial expression of the user in the edited image is associated with a facial expression of the user in the second face image.

Figure 1B:
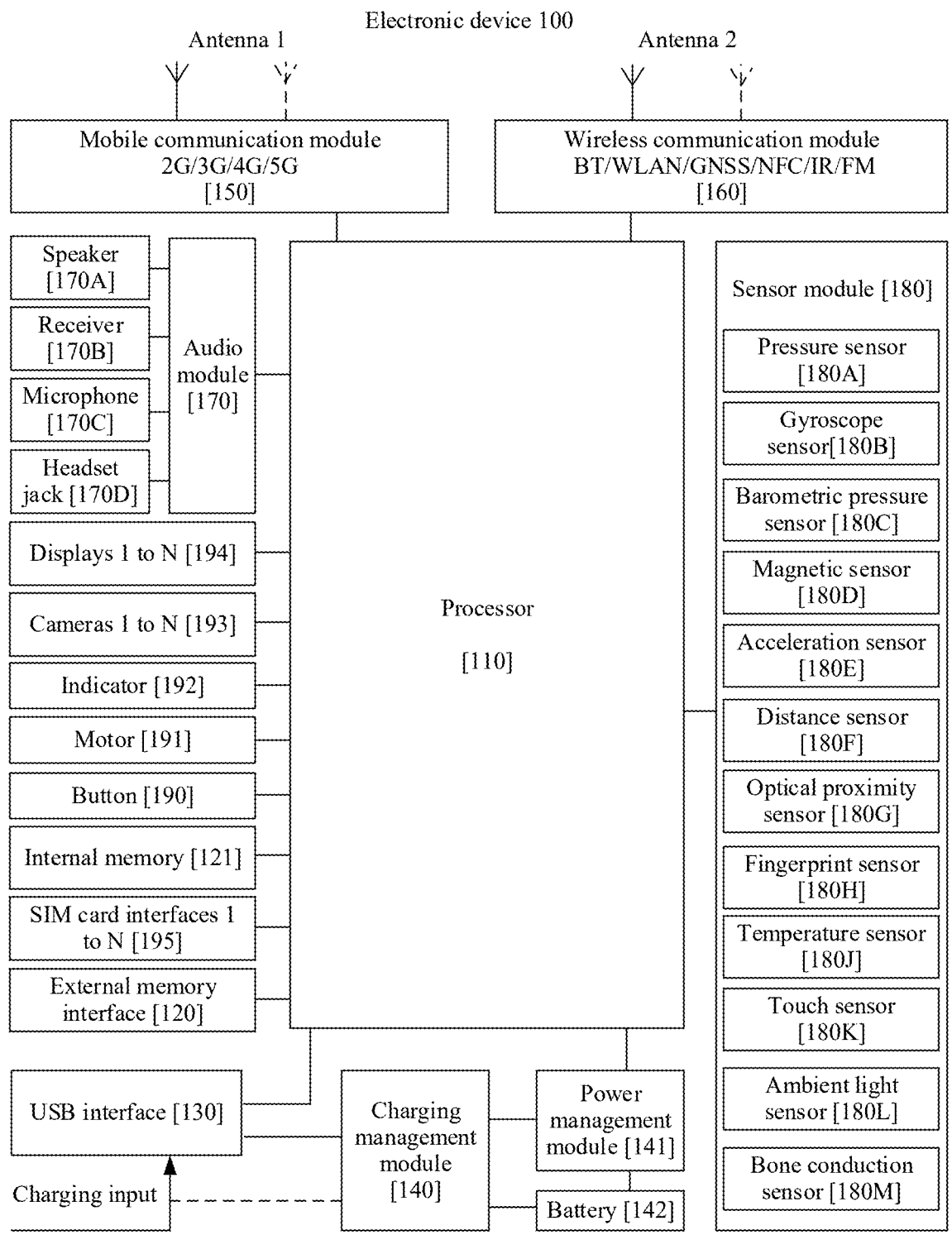
FIG. 1B is a schematic diagram of a structure of a first electronic device according to an embodiment of this disclosure.

The following describes a structure related to the foregoing electronic device. FIG. 1B is a schematic diagram of a structure of a first electronic device 100.

It should be understood that the electronic device 100 may have more or fewer components than those shown in the figure, or two or more components may be combined, or different component configurations may be used. Various components shown in the figure may be implemented in hardware, software, or a combination of hardware and software that includes one or more signal processing and/or application-specific integrated circuits.

The electronic device 100 may include a processor 110, an external memory interface 120, an internal memory 121, a Universal Serial Bus (USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of this disclosure constitutes no specific limitation on the electronic device 100. In some other embodiments of this disclosure, the electronic device 100 may include more or fewer components than those shown in the figure, or some components may be combined, or some components may be split, or different component arrangements may be used. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, a neural-network processing unit (NPU), and/or the like. Different processing units may be independent components, or may be integrated into one or more processors.

The controller may be a nerve center and a command center of the electronic device 100. The controller may generate an operation control signal based on an instruction operation code and a time sequence signal, to complete control of instruction reading and instruction execution.

A memory may be further disposed in the processor 110, and is configured to store instructions and data. In some embodiments, the memory in the processor 110 is a cache memory. The memory may store instructions or data that has been used or cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interface may include an Inter-Integrated Circuit (I2C) interface, an I2C Sound (I2S) interface, a pulse code modulation (PCM) interface, a universal asynchronous receiver/transmitter (UART) interface, a mobile industry processor interface (MIPI), a general-purpose input/output (GPIO) interface, a SIM interface, a USB interface, and/or the like.

It may be understood that an interface connection relationship between the modules shown in this embodiment of this disclosure is merely an example for description, and constitutes no limitation on the structure of the electronic device 100. In some other embodiments of this disclosure, the electronic device 100 may alternatively use an interface connection manner different from that in the foregoing embodiment, or use a combination of a plurality of interface connection manners.

The charging management module 140 is configured to receive a charging input from a charger. The charger may be a wireless charger or a wired charger.

The power management module 141 is configured to connect the battery 142 and the charging management module 140 to the processor 110. The power management module 141 receives input of the battery 142 and/or the charging management module 140, to supply power to the processor 110, the internal memory 121, an external memory, the display 194, the camera 193, the wireless communication module 160, and the like.

A wireless communication function of the electronic device 100 may be implemented by using the antenna 1, the antenna 2, the mobile communication module 150, the wireless communication module 160, the modem processor, the baseband processor, and the like.

The electronic device 100 may implement a display function through the GPU, the display 194, the application processor, and the like. The GPU is a microprocessor for image processing, and is connected to the display 194 and the application processor. The GPU is configured to perform mathematical and geometric computation, and render an image. The processor 110 may include one or more GPUs, which execute program instructions to generate or change display information.

The display 194 is configured to display an image, a video, and the like. The display 194 includes a display panel. The display panel may be a liquid-crystal display (LCD), an organic light-emitting diode (LED) (OLED), an active-matrix OLED (AMOLED), a flexible LED (FLED), a mini-LED, a micro-LED, a micro-OLED, a quantum dot LED (QLED), or the like. In some embodiments, the electronic device 100 may include one or N displays 194, where N is a positive integer greater than 1.

The electronic device 100 may implement a photographing function by using the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge-coupled device (CCD) or a complementary metal-oxide-semiconductor (CMOS) phototransistor. The light-sensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as red, green, and blue (RGB) or luma, blue projection, and red projection (YUV). In embodiments of this disclosure, the camera 193 includes a camera that captures an image required for facial recognition, for example, an infrared camera or another camera. The camera for collecting an image required for facial recognition is usually located on a front side of an electronic device, for example, above a touchscreen, or may be located at another position. This is not limited in embodiments of this disclosure. In some embodiments, the electronic device 100 may include another camera. The electronic device may further include a dot matrix transmitter (which is not shown in the figure), to emit light. The camera collects light reflected by a face to obtain a face image. The processor processes and analyzes the face image, and compares the face image with stored face image information for verification.

The digital signal processor is configured to process a digital signal, and may process another digital signal in addition to the digital image signal. For example, when the electronic device 100 selects a frequency, the digital signal processor is configured to perform Fourier transformation on frequency energy.

The video codec is configured to compress or decompress a digital video. The electronic device 100 may support one or more video codecs. In this way, the electronic device 100 may play back or record videos in a plurality of coding formats, for example, Moving Picture Experts Group (MPEG)-1, MPEG-2, MPEG-3, and MPEG-4.

The NPU is a neural-network (NN) computing processor. The NPU quickly processes input information by referring to a structure of a biological neural network, for example, a transfer mode between human brain neurons, and may further continuously perform self-learning. Applications such as intelligent cognition of the electronic device 100 may be implemented through the NPU, for example, image recognition, facial recognition, speech recognition, and text understanding.

The external memory interface 120 may connect to an external storage card, for example, a micro Secure Digital (SD) card, to extend a storage capability of the electronic device 100. The external storage card communicates with the processor 110 through the external memory interface 120, to implement a data storage function. For example, files such as music and videos are stored in the external storage card.

The internal memory 121 may be configured to store computer-executable program code. The executable program code includes instructions. The processor 110 runs the instructions stored in the internal memory 121, to perform various function applications of the electronic device 100 and data processing. The internal memory 121 may include a program storage area and a data storage area. The program storage area may store an operating system, an application required by at least one function (for example, a facial recognition function, a fingerprint recognition function, and a mobile payment function), and the like. The data storage area may store data (for example, facial information template data and a fingerprint information template) and the like created when the electronic device 100 is used. In addition, the internal memory 121 may include a high-speed random-access memory (RAM), or may include a non-volatile memory, for example, at least one magnetic disk storage device, a flash memory, or a universal flash storage (UFS).

The electronic device 100 may implement an audio function, for example, music playing and recording, through the audio module 170, the speaker 170A, the receiver 170B, the microphone 170C, the headset jack 170D, the application processor, and the like.

The audio module 170 is configured to convert digital audio information into an analog audio signal for output, and is also configured to convert analog audio input into a digital audio signal.

The speaker 170A, also referred to as a "loudspeaker", is configured to convert an audio electrical signal into a sound signal.

The receiver 170B, also referred to as an "earpiece", is configured to convert an audio electrical signal into a sound signal.

The microphone 170C, also referred to as a "mike" or a "mic", is configured to convert a sound signal into an electrical signal.

The headset jack 170D is configured to connect to a wired headset. The headset jack 170D may be a USB interface 130, or may be a 3.5 millimeter (mm) Open Mobile Terminal Platform (OMTP) standard interface or cellular telecommunications industry association of the United States of America (USA) (CTIA) standard interface.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor.

The gyroscope sensor 180B may be configured to determine a moving posture of the electronic device 100. In some embodiments, an angular velocity of the electronic device 100 around three axes (namely, axes x, y, and z) may be determined through the gyroscope sensor 180B.

The optical proximity sensor 180G may include, for example, an LED and an optical detector, for example, a photodiode. The LED may be an infrared LED.

The ambient light sensor 180L is configured to sense ambient light brightness. The electronic device 100 may adaptively adjust brightness of the display 194 based on the sensed ambient light brightness. The ambient light sensor 180L may also be configured to automatically adjust white balance during photographing.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like. The fingerprint sensor 180H may be disposed below the touchscreen. The electronic device 100 may receive a touch operation of a user in an area corresponding to the fingerprint sensor on the touchscreen, and collect fingerprint information of a finger of the user in response to the touch operation, to implement opening of a hidden album after fingerprint recognition succeeds, starting of a hidden application after fingerprint recognition succeeds, account logging after fingerprint recognition succeeds, payment after fingerprint recognition succeeds, and the like described in embodiments of this disclosure.

The temperature sensor 180J is configured to detect a temperature. In some embodiments, the electronic device 100 executes a temperature processing policy through the temperature detected by the temperature sensor 180J.

The touch sensor 180K is also referred to as a touch panel. The touch sensor 180K may be disposed on the display 194, and the touch sensor 180K and the display 194 constitute a touchscreen, which is also referred to as a "touch screen". The touch sensor 180K is configured to detect a touch operation performed on or near the touch sensor. The touch sensor may transfer the detected touch operation to the application processor to determine a type of the touch event. A visual output related to the touch operation may be provided through the display 194. In some other embodiments, the touch sensor 180K may also be disposed on a surface of the electronic device 100 at a location different from that of the display 194.

The button 190 includes a power button, a volume button, and the like. The button 190 may be a mechanical button, or may be a touch button. The electronic device 100 may receive a button input, and generate a button signal input related to a user setting and function control of the electronic device 100.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 100. In some embodiments, the electronic device 100 uses an eSIM, that is, an embedded SIM card. The eSIM card may be embedded into the electronic device 100, and cannot be separated from the electronic device 100.

A software system of the electronic device 100 may use a layered architecture, an event-driven architecture, a microkernel architecture, a micro service architecture, or a cloud architecture. In embodiments of this disclosure, an ANDROID system with a layered architecture is used as an example to describe a software structure of the electronic device 100.

In this disclosure, after detecting a touch command for starting the camera 193, the touch sensor 180K sends an instruction for starting the camera 193 to the processor 110. The processor 110 starts the camera 193, and the camera 193 starts to obtain a first video stream including a second face image of the user. The processor 110 further obtains a to-be-edited image from the internal memory 121 of the electronic device 100. The to-be-edited image includes a first face image of the user. The processor edits the first face image of the user in the to-be-edited image based on the second face image of the user in the first video stream, to obtain an edited image. A facial expression of the user in the edited image is associated with a facial expression of the user in the first video stream. The to-be-edited image, the first video stream obtained by the camera 193 in real time, and a real-time effect image obtained by editing the to-be-edited image in real time are displayed on the display 194.

Figure 2:
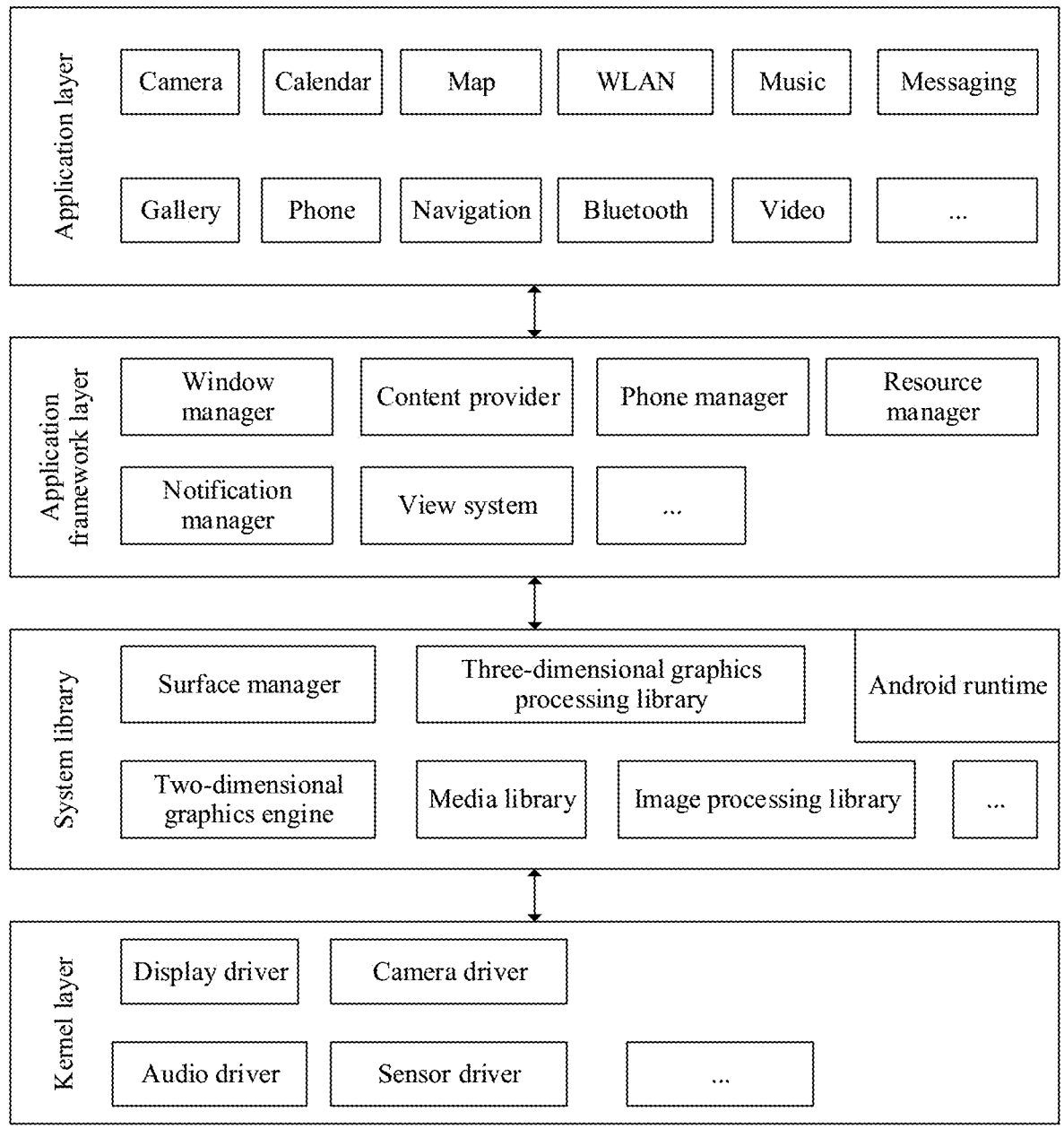
FIG. 2 is a schematic diagram of a software structure of an electronic device according to an embodiment of this disclosure.

FIG. 2 is a block diagram of a software structure of an electronic device 100 according to an embodiment of this disclosure.

In a layered architecture, software is divided into several layers, and each layer has a clear role and task. The layers communicate with each other through a software interface.

In some embodiments, the ANDROID system is divided into four layers an application layer, an application framework layer, an ANDROID runtime and system library, and a kernel layer from top to bottom.

The application layer may include a series of application packages.

As shown in FIG. 2, the application packages may include application programs (or referred to as applications) such as camera, gallery, calendar, phone, map, navigation, wireless local area network (WLAN), BLUETOOTH, music, video, and messaging.

The application framework layer provides an application programming interface (API) and a programming framework for an application at the application layer. The application framework layer includes some predefined functions.

As shown in FIG. 2, the application framework layer may include a window manager, a content provider, a view system, a phone manager, a resource manager, a notification manager, and the like.

The window manager is configured to manage a window program. The window manager may obtain a size of the display, determine whether there is a status bar, perform screen locking, take a screenshot, and the like.

The content provider is configured to store and obtain data, and enable the data to be accessed by an application. The data may include a video, an image, audio, calls that are made and answered, a browsing history and bookmarks, an address book, and the like.

The view system includes visual controls such as a control for displaying a text and a control for displaying an image. The view system may be configured to construct an application. A display interface may include one or more views. For example, a display interface including an SMS message notification icon may include a text display view and an image display view.

The phone manager is configured to provide a communication function of the electronic device 100, for example, management of a call status (including answering, declining, or the like).

The resource manager provides various resources such as a localized character string, an icon, an image, a layout file, and a video file for an application.

The notification manager enables an application to display notification information in a status bar, and may be configured to convey a notification message. The notification manager may automatically disappear after a short pause without requiring a user interaction. For example, the notification manager is configured to notify download completion, give a message notification, and the like. The notification manager may alternatively be a notification that appears in a top status bar of the system in a form of a graph or a scroll bar text, for example, a notification of an application running on a background or a notification that appears on the screen in a form of a dialog interface. For example, text information is displayed in the status bar, an announcement is given, the electronic device vibrates, or the indicator light blinks.

The ANDROID runtime includes a kernel library and a virtual machine. The ANDROID runtime performs scheduling and management of the ANDROID system.

The kernel library includes two parts a function that needs to be invoked in java language and a kernel library of ANDROID.

The application layer and the application framework layer run on the virtual machine. The virtual machine executes java files of the application layer and the application framework layer as binary files. The virtual machine is configured to implement functions such as object lifecycle management, stack management, thread management, security and exception management, and garbage collection.

The system library may include a plurality of functional modules, for example, a surface manager, a media library, a 3D graphics processing library (for example, OpenGL ES), and a 2D graphics engine (for example, SGL).

The surface manager is configured to manage a display subsystem and provide fusion of 2D and 3D layers for a plurality of applications.

The media library supports playback and recording in a plurality of commonly used audio and video formats, and static image files. The media library may support a plurality of audio and video coding formats, for example, MPEG4, H.264, MPEG-1 Audio Layer III or MPEG-2 Audio Layer III (MP3), Advanced Audio Coding (AAC), Adaptive Multi-Rate (AMR), Joint Photographic Experts Group (JPEG), and Portable Network Graphics (PNG).

The 3D graphics processing library is configured to implement 3D graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

Refer to FIG. 2. In this embodiment of this disclosure, the system library may further include an image processing library. After a camera application is started, the camera application may obtain a first video stream that is collected by the electronic device and that includes a second face image of a user. The image processing library obtains a to-be-edited image. The to-be-edited image includes a first face image of the user. Then, the image processing library edits the first face image of the user in the to-be-edited image based on the second face image of the user in the first video stream to obtain an edited image. A facial expression of the user in the edited image is associated with a facial expression of the user in the first video stream. The view system is configured to display the to-be-edited image, the first video stream, and a real-time effect image obtained by editing the to-be-edited image in real time, and the media library is configured to store a video including an editing process or the edited image. For a specific process, refer to the following related description.

It should be noted herein that an application scenario of the method in this disclosure includes but is not limited to offline face-related algorithm training, and an online pixel-to-pixel real-time transformation application for a mobile phone, a personal computer (PC), and a cloud, for example, a beautification, painting, or video live chat application.

The following describes a specific implementation in which the electronic device 100 edits a face image of the user.

Figure 3:
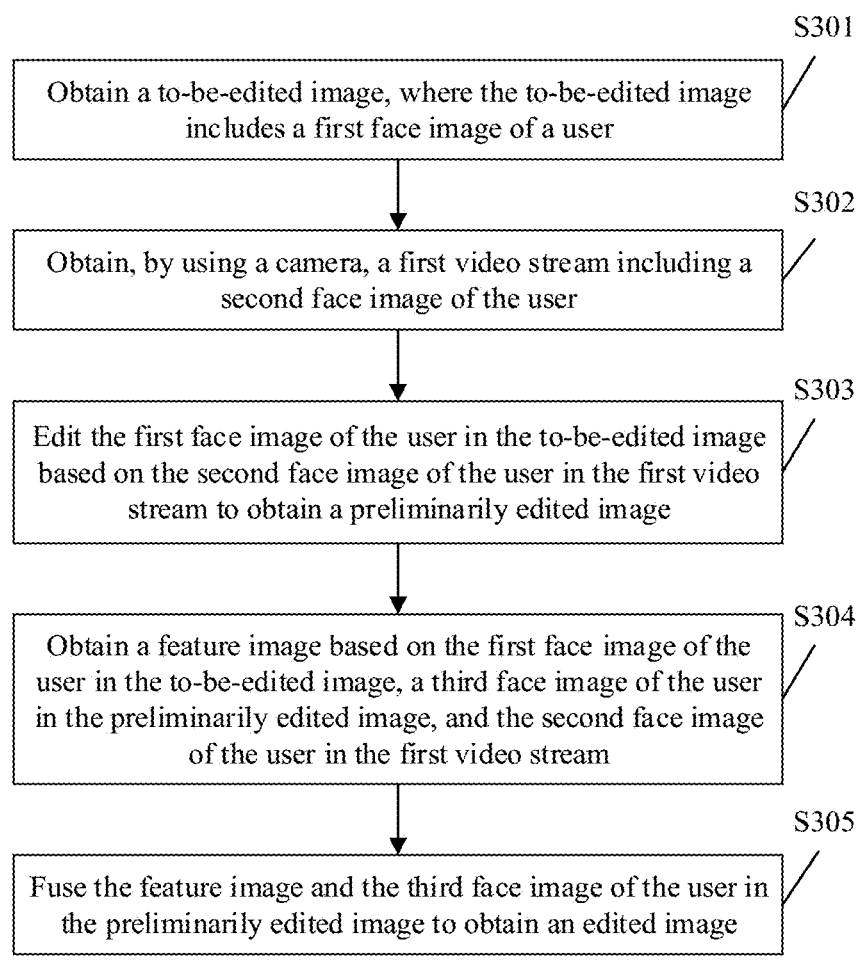
FIG. 3 is a schematic flowchart of a facial expression editing method according to an embodiment of this disclosure.

FIG. 3 is a schematic flowchart of a facial expression editing method according to an embodiment of this disclosure. As shown in FIG. 3, the method includes the following steps.

S301: Obtain a to-be-edited image, where the to-be-edited image includes a first face image of a user.

Optionally, the to-be-edited image may be an image that includes the first face image of the user and that is selected by the user from an album of the electronic device, or may be an image that includes the first face image of the user and that is obtained by using a camera of the electronic device. Optionally, the camera may be a front-facing camera. The user may independently edit the user's facial expression by using the front-facing camera without any additional help.

Optionally, when the to-be-edited image is selected from the album of the electronic device, a display interface of the electronic device displays a first prompt message. The first prompt message prompts the user to select the to-be-edited image.

Further, the first prompt message further prompts the user to select an image including a face image of the user as the to-be-edited image.

Optionally, the face image (including the first face image, a second face image, a third face image, and a fourth face image in this disclosure) in this disclosure may be an image including all facial features or an image in which all facial features can be recognized by the electronic device, for example, a front face image, an image including some facial features (for example, a side face image), or an image of the front face image rotated by a specific angle.

S302: Obtain a first video stream including the second face image of the user.

In an example, the first video stream includes a plurality of frames of image. Editing the first face image of the user in the to-be-edited image based on the second face image of the user in the first video stream may be editing the first face image of the user in the to-be-edited image based on the second face image of the user in the plurality of frames of image in the first video stream. Each frame of image in the plurality of frames of image includes the second face image of the user. The plurality of frames of image can improve effect of editing the first face image of the user in the to-be-edited image based on the second face image.

In an example, obtaining the first video stream including the second face image of the user may include obtaining, by using the camera, the first video stream including the second face image of the user. Optionally, obtaining the first video stream including the second face image of the user may alternatively be receiving the first video stream including the second face image of the user, or invoking the stored first video stream including the second face image of the user.

To better capture a facial expression of the user by using the camera, when the first video stream including the second face image of the user is obtained by using the camera, the electronic device prompts the user to adjust a status of an image of the user in a preview interface and a camera angle. For example, the user is prompted to change a distance between a head and a lens, or change a relative position between the head and the lens. For another example, the user is prompted to change a head posture, a light angle, or strength. For still another example, the user is prompted to remove an obstacle such as a hat, a mask, or glasses. Optionally, the user may be prompted by a text in the prompt message, or may be prompted by a voice.

S303: Edit the first face image of the user in the to-be-edited image based on the second face image of the user in the first video stream to obtain a preliminarily edited image.

The preliminarily edited image includes the third face image of the user, and the third face image is obtained by editing the first face image based on the second face image of the user.

In an example, editing the first face image of the user in the to-be-edited image based on the second face image of the user in the first video stream to obtain the preliminarily edited image includes determining a first target parameter based on the second face image of the user in the first video stream and the first face image of the user in the to-be-edited image, where the first target parameter is a vector describing a face shape of the user, determining a second target parameter, a third target parameter, and a fourth target parameter based on the first target parameter and the to-be-edited image, where the second target parameter indicates a size of a face of the user, the third target parameter indicates a rotation matrix or an Euler angle of a head posture of a 3D face of the user, and the fourth target parameter indicates a translation vector required when a 3D head of the user in a Cartesian coordinate system is mapped to an image coordinate system, determining a fifth target parameter based on the first target parameter and the second face image of the user in the first video stream, where the fifth target parameter is a vector describing a facial expression of the user in the first video stream, building a target face model based on the first target parameter, the second target parameter, the third target parameter, the fourth target parameter, and the fifth target parameter, and performing rendering and reconstruction on the target face model to obtain the preliminarily edited image.

In a possible implementation, the face model may be expressed as follows:

$$V = s \cdot R \cdot (\overline{V} + A_{id} \cdot \text{Alpha\_id} + A_{exp} \cdot \text{Alpha\_exp}) + T, \text{ where}$$

V indicates a 3D face model, $\overline{V}$ indicates an average 3D face model, or may be understood as a face model of an ordinary face, s indicates a size of a face, R indicates a rotation matrix or an Euler angle of a head posture of the 3D face, T indicates a translation vector required when a 3D head in a Cartesian coordinate system is mapped to an image coordinate system, Aid is an expression orthogonal basis describing a face shape, $A_{exp}$ is an expression orthogonal basis describing a facial expression, Alpha_id is a vector describing the face shape, where the vector is not related to the head posture of the user, and the vector tends to be consistent for a same person in different expressions, Alpha_exp is a vector describing the facial expression, where the vector is not related to the head posture of the user, and the vector tends to be consistent for a same person in different expressions.

Optionally, a first target parameter, second target parameter, third target parameter, fourth target parameter, and fifth target parameter are respectively alpha_id, s, R, T, and alpha_exp.

In an example, the first video stream includes N images, where N is an integer greater than 1. Each of the N images includes the second face image of the user. Determining the first target parameter based on the second face image of the user in the first video stream and the first face image of the user in the to-be-edited image includes performing modeling on the second face image of the user in each of the N images to obtain a first parameter of each image, where the first parameter of each image is a vector describing a face shape of the user in each image, performing modeling on the first face image of the user in the to-be-edited image to obtain a second parameter of the to-be-edited image, where the second parameter is a vector describing a face shape of the user in the to-be-edited image, and determining the first target parameter based on the first parameter of each of the N images and the second parameter of the to-be-edited image. Optionally, sums of the first parameters of the N images and the second parameter of the to-be-edited image are calculated, and then an average is calculated, or weighted sums and a weighted average are calculated, to obtain the first target parameter.

Further, face modeling is performed on the first face image of the user in the to-be-edited image based on a convolutional neural network to obtain a first face model of the user in the to-be-edited image. An expression coefficient of the first face model is (s_1, R_1, T_1, alpha_id_1, alpha_exp_1). Face modeling is performed on the second face image of the user in each of the N images based on the convolutional neural network to obtain a second face model of the user in each image. An expression coefficient of the second face model is (s_2, R_2i, T_2i, alpha_id_2i, alpha_exp_2i), i=1, 2, 3, . . . , or N. Sums or weighted sums of the parameters alpha_id_1 and alpha_id_21, alpha_id_22, . . . , and alpha_id_2N are calculated. Then, an average of the sums is calculated to obtain the first target parameter alpha_id_x, where:

alpha_id_x=(alpha_id_1+alpha_id_21+alpha_id_22+ . . . +alpha_id_2N)/(N+1), or alpha_id_x=(w×alpha_id_1+w_1×alpha_id_21+w_2×alpha_id_22+ . . . +w_N×alpha_id_2N)/(N+1), and where w, w_1, w_2, . . . , and w_N are respectively weights of alpha_id_1, alpha_id_21, . . . , alpha_id_22, and alpha_id_2N.

After the first target parameter alpha_id_x is determined, modeling is performed again on the first face image of the user in the to-be-edited image based on the first target parameter alpha_id_x, to obtain a new first face model. An expression coefficient of the model is (s_3, R_3, T_3, alpha_id_x, alpha_exp_3). Modeling is performed again on the second face image of the user in the first video stream based on the first target parameter alpha_id_x, to obtain a new second face model. An expression coefficient of the model is (s_4, R_4, T_4, alpha_id_x, alpha_exp_4). The target face model is built based on the first target parameter alpha_id_x, the second target parameter s_3, the third target parameter R_4, the fourth target parameter T_3, and the fifth target parameter alpha_exp_4. The target face model may be expressed as follows:

$$V'=s\_3 \cdot R\_3 \cdot (\overline{V} + A_{id} \cdot \text{Alpha\_id\_x} + A_{exp} \cdot \text{Alpha\_exp\_4}) + T\_3.$$

After the target face model is obtained, rendering and reconstruction are performed on the target face model to obtain the preliminarily edited image.

Performing rendering and reconstruction on the target face model to obtain the preliminarily edited image may include performing projection rendering based on triangulation, a 3D vertex, and a vertex color or a texture image of the target face model, to obtain the preliminary edited image. Optionally, the texture image may be a UV map of the target face model.

A photo is re-edited based on a precise face model. Content that does not exist in an actual situation is not added to the photo. This can restore actual effect of the user's face, and obtain an edited image of high quality.

S304: Obtain a feature image based on the first face image of the user in the to-be-edited image, the third face image of the user in the preliminarily edited image, and the second face image of the user in the first video stream.

Optionally, the feature image may include the image of the eye and the oral cavity of the user, and may further include an image of a part other than the eye and the oral cavity of the user, for example, an ear, a nose, or an eyebrow. Further, the image of the oral cavity may also be understood as an image of a mouth. The image of the oral cavity may be an oral cavity image in which the mouth is open, or may be an oral cavity image in which the mouth is closed.

Further, image segmentation is separately performed on the first face image of the user in the to-be-edited image, the third face image of the user in the preliminarily edited image, and the second face image of the user in the first video stream, to obtain a first image, a second image, and a third image. The first image is an image that is in the to-be-edited image and that includes the eye and the oral cavity of the user. The second image is an image that is in the preliminarily edited image and that includes the eye and the oral cavity of the user. The third image is an image that is in the first video stream and that includes the eye and the oral cavity of the user. A feature of the eye and the oral cavity in the first image, the second image, and the third image is encoded to obtain a feature vector of the images of the eye and the oral cavity of the user. The feature image is generated based on the feature vector of the images of the eye and the oral cavity of the user.

Figure 6:
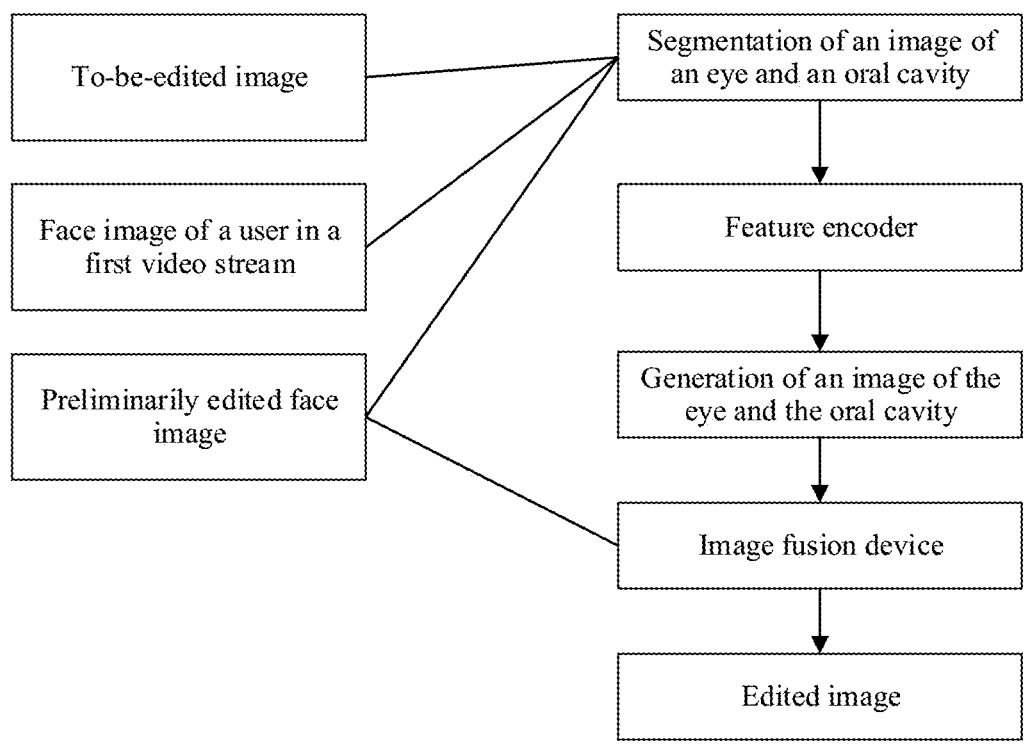
FIG. 6 is a schematic flowchart of respectively extracting images of a user's eye and oral cavity according to an embodiment of this disclosure.

As shown in FIG. 6, image segmentation is separately performed on the first face image of the user in the to-be-edited image, the third face image of the user in the preliminarily edited image, and the second face image of the user in the first video stream, to obtain a first image, a second image, and a third image. The first image is an image that is in the to-be-edited image and that includes the eye and the oral cavity of the user. The second image is an image that is in the preliminarily edited image and that includes the eye and the oral cavity of the user. The third image is an image that is in the first video stream and that includes the eye and the oral cavity of the user. A feature of the eye and the oral cavity in the first image, the second image, and the third image is encoded by using a feature encoder to obtain a feature vector of the images of the eye and the oral cavity of the user. The feature image is generated by performing deconvolution and upsampling on the feature vector based on a neural network.

S305: Fuse the feature image and the third face image of the user in the preliminarily edited image to obtain an edited image.

Optionally, an image fusion algorithm, such as image overlay or Poisson editing, or a neural network algorithm (for example, a gradient penalty-generative adversarial network (GP-GAN)) may be used.

After the feature image is obtained, the third face image of the user in the preliminarily edited image and the feature image are fused by using an image fusion device, to obtain the edited image. The edited image includes a first facial expression of the user, the second face image includes a second facial expression of the user, and the first facial expression is associated with the second facial expression.

Further, that the first facial expression is associated with the second facial expression includes the following.

The first facial expression is the second facial expression. Alternatively, a mean square error between a first vector and a second vector is less than a first threshold. The first vector is a vector indicating the first facial expression, and the second vector is a vector indicating the second facial expression. Alternatively, a similarity between the first facial expression and the second facial expression is less than a second threshold.

Optionally, similarities of five features may be fused into the similarity of the facial expression based on different weights.

Optionally, the first threshold may be 0.1, 0.2, 0.5, 0.7, or another value. The first threshold is 0.5. Optionally, the second threshold may be 0.7, 0.8, 0.85, 0.9, or another value.

In an example, the first vector and the second vector are alpha_exp in the expression coefficients of the face models.

To facilitate the user to view editing effect of the to-be-edited image in real time, three areas in the display interface of the electronic device respectively display the to-be-edited image, the image that is obtained by the camera in real time and that includes the face of the user, and an effect image obtained by editing the to-be-edited image in real time. An interface displaying the effect image obtained by editing the to-be-edited image in real time may be referred to as a preview interface.

Figure 7:
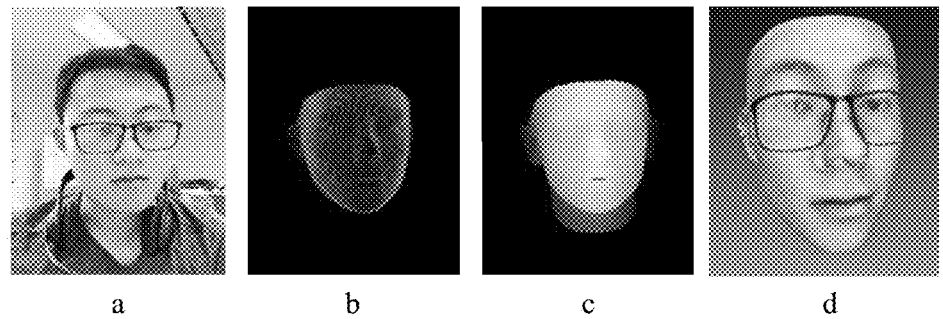
FIG. 7 is a schematic diagram of effect of performing face modeling on a to-be-edited image.

As shown in FIG. 7, a in FIG. 7 is a to-be-edited image, b is a face model of a user in the to-be-edited image, c is a schematic diagram of a face model obtained after dense processing is performed on the face model in b, and d is a schematic diagram of a model obtained after face information is added to the face model obtained after dense processing.

Figure 8:
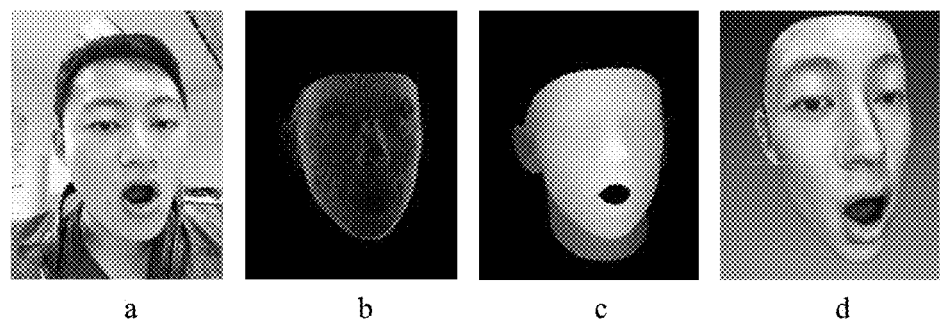
FIG. 8 is a schematic diagram of effect of performing face modeling on a face image in a first video stream.

As shown in FIG. 8, a in FIG. 8 is a face image of the user in a first video stream, b is a face model of the user in the first video stream, the figure is a schematic diagram of a face model obtained after dense processing is performed on the face model in c, and d is a schematic diagram of a model obtained after face information is added to the face model obtained after dense processing.

Figure 9:
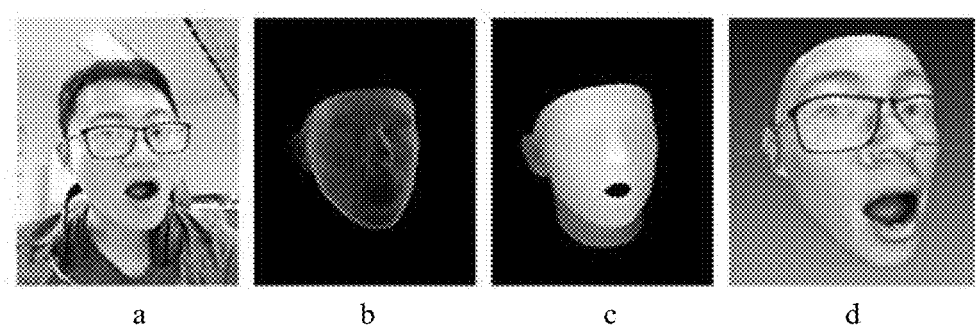
FIG. 9 is a schematic diagram of effect of an edited image.

As shown in FIG. 9, a in FIG. 9 is an edited image, b is an image of a target face model, c is a schematic diagram of a face model obtained after dense processing is performed on the target face model, and c is a schematic diagram of a model obtained after face information is added to the face model obtained after dense processing.

It should be noted herein that the face model includes a plurality of 3D points, and dense processing on the face model further adds a corresponding depth value to each point of the face model.

To prevent the user from re-editing a face image other than that of the user and avoid ethical issues and public opinions, whether the face image in the to-be-edited image is a face image of the user needs to be determined.

In an example, before obtaining, by using the camera, the first video stream including the second face image of the user, a second video stream including the fourth face image of the user is obtained by using the camera. A facial feature is extracted from the fourth face image of the user in the second video stream to obtain a first facial feature. A facial feature is extracted from the first face image of the user in the to-be-edited image to obtain a second facial feature. When the first facial feature matches the second facial feature, it is determined that the first face image in the to-be-edited image and the fourth face image in the second video stream are of a same person.

Figure 5:
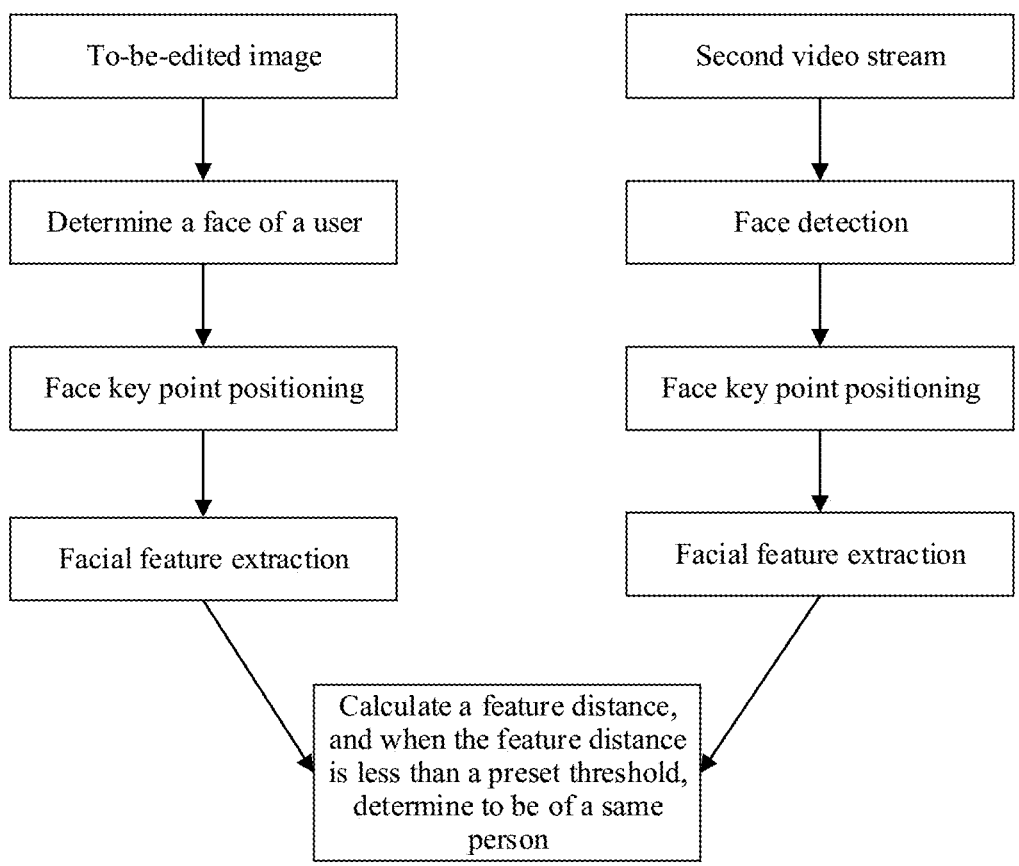
FIG. 5 is a schematic flowchart of facial recognition according to an embodiment of this disclosure.

Further, the facial feature may be a facial feature vector. After the second video stream including the fourth face image of the user is obtained by using the camera, as shown in FIG. 5, the first face image of the user is determined from the to-be-edited image, key point positioning is performed on the first face image of the user, and a facial feature is extracted to obtain a second facial feature vector. Optionally, after the first face image of the user is determined from the to-be-edited image, a bounding box is added to the first face image of the user, to indicate a face location of the user. Face detection is performed on the fourth face image of the user in the second video stream, and face key point positioning and facial feature extraction are performed to obtain a first facial feature vector. A feature distance between the first facial feature vector and the second facial feature vector is calculated. If the feature distance is less than a preset threshold, it is determined that the first face image in the to-be-edited image and the fourth face image in the second video stream are of the same person, and the first video stream including the second face image of the user is obtained by using the camera. In other words, a related operation such as editing the first face image of the user in the to-be-edited image is performed. If the feature distance is not less than a preset threshold, it is determined that the first face image in the to-be-edited image and the second face image in the second video stream are not of the same person, and the first video stream including the second face image of the user is not obtained by using the camera. In other words, a related operation such as editing the first face image of the user in the to-be-edited image is not performed.

Optionally, during facial recognition, a static face image of the user may be obtained by using the camera, and then whether the face image of the user obtained by the camera and the to-be-edited image are of a same person is determined based on the foregoing feature extraction and a determining process. A specific process is not described herein again.

It is determined that the to-be-edited image includes a face image of the user, so that the user is allowed to edit the face image only of the user, thereby avoiding ethical issues and public opinions.

In an example, the method in this disclosure further includes the following steps.

When the camera is started to obtain the first video stream, whether to record a video of a facial expression editing process of the user is determined. If it is determined that the video of the facial expression editing process of the user is recorded, a plurality of frames of image or all images in the video of the facial expression editing process of the user are stored after obtaining the edited image. The plurality of frames of image or all the images includes the edited image. If it is determined that the video of the facial expression editing process of the user is not recorded, the edited image is stored after obtaining the edited image.

Optionally, the plurality of frames of image in the video of the facial expression editing process of the user may be consecutive frames of image, and the consecutive frames of image may be considered as a video clip of the video of the facial expression editing process of the user. Alternatively, the plurality of frames of image in the video of the facial expression editing process of the user may not be consecutive frames of image, and the non-consecutive frames may also form a video clip.

After the edited image or the video or the video clip of the facial expression editing process of the user is stored, the user may view the edited image or the video or the video clip of the facial expression editing process of the user in the album of the electronic device. When viewing the video or the video clip, the user can see beautification effect of a facial expression in a photo, and see unique effect in which everyone else in the photo remains unchanged and only the facial expression of the user is changing.

It can be learned that in the solutions in embodiments of this disclosure, the user can only re-edit, by using facial recognition, a facial expression of the user, thereby avoiding ethical issues and public opinions. The first face image of the user in the to-be-edited image is re-edited based on the second face image of the user in the first video stream obtained by using the camera. A precise face model is built based on the to-be-edited image and the face image in the first video stream. A photo is re-edited based on the precise face model. Content that does not exist in an actual situation is not added to the photo. This can restore actual effect of the user's face, assist in beautification on a face image of the user, re-edit a facial expression of the user in the static photo based on the user's face image captured by using the camera in real time, implement an expression re-editing function, achieve more realistic effect, make an improvement in current 2D/3D beautification that only changes a skin color and a face contour in the industry, and improve user experience.

It may be understood that the method shown in FIG. 3 may further include displaying the to-be-edited image in a display interface of a first device. When the user needs to perform expression editing on the first face image of the user, the user may perform a first operation in the display interface of the first device. After receiving the first operation in the display interface of the first device from the user, the first device performs the facial expression editing method shown in FIG. 3 in response to the first operation. The first operation may include one or more of the following: sliding, tapping, dragging, and inputting. The first device obtains the first video stream, where the first video stream includes the second face image of the user, obtains a target image from the first video stream, where the target image includes a target expression of the user, edits the to-be-edited image based on the target image to obtain the edited image, where an expression of the user in the edited image is closer to the target expression of the user than a facial expression of the user in the to-be-edited image, and displays the edited image in the display interface of the first device.

Figure 4:
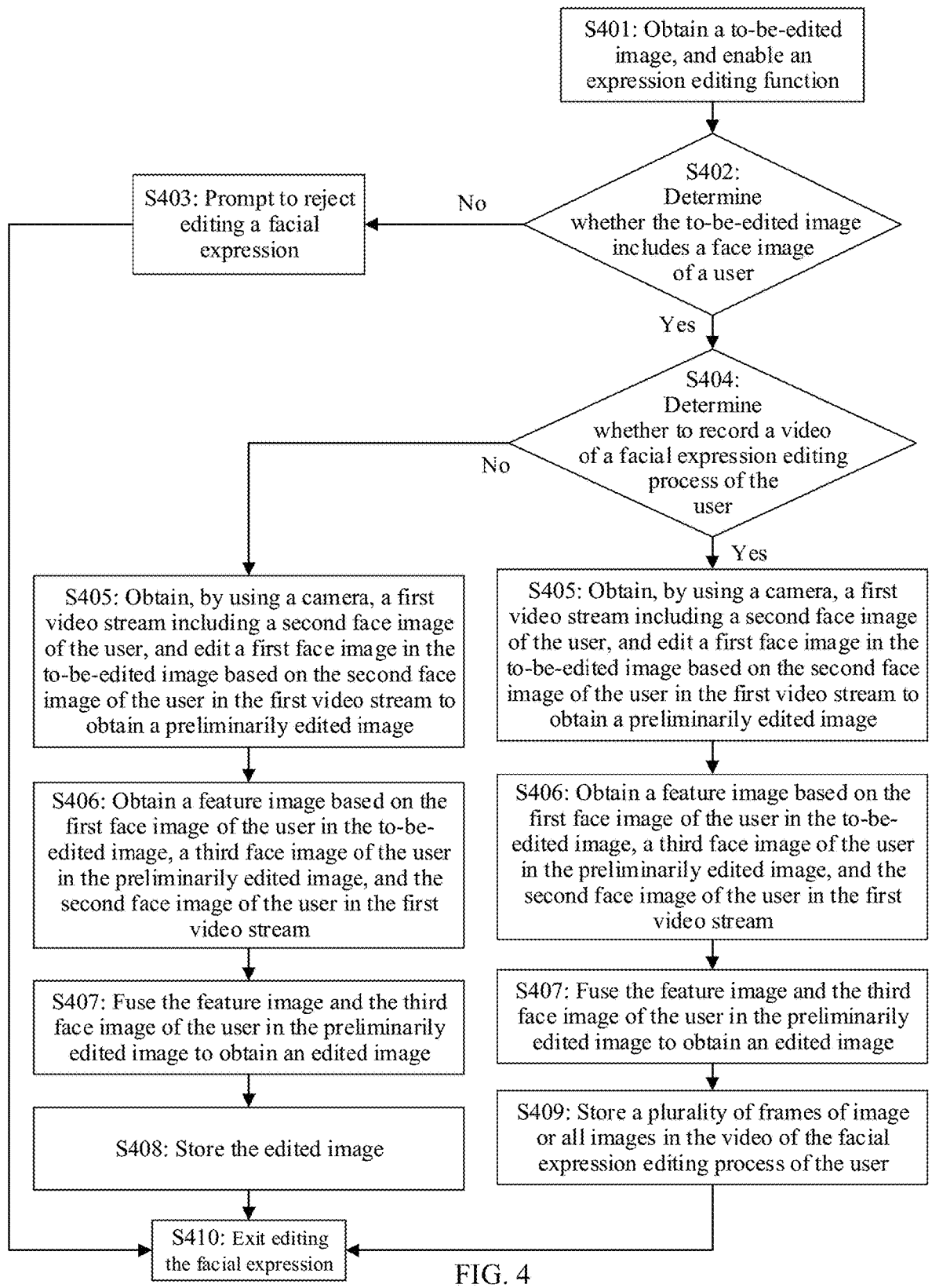
FIG. 4 is a schematic flowchart of another facial expression editing method according to an embodiment of this disclosure.

FIG. 4 is a schematic flowchart of another facial expression editing method according to an embodiment of this disclosure. As shown in FIG. 4, the method includes the following steps. S401: Obtain a to-be-edited image, and enable an expression editing function.

The to-be-edited image includes a first face image of a user.

Optionally, the to-be-edited image may be an image that includes a face of the user and that is selected by the user from an album of an electronic device, or may be an image that includes the first face image of the user and that is obtained by using a camera of the electronic device.

Optionally, when the to-be-edited image is selected from the album of the electronic device, a display interface of the electronic device displays a first prompt message. The first prompt message prompts the user to select the to-be-edited image.

Further, the first prompt message further prompts the user to select an image including a face image of the user as the to-be-edited image.

S402: Determine whether the to-be-edited image includes the face image of the user.

Further, the camera of the electronic device is started to obtain a second video stream that includes a fourth face image of the user. A facial feature is extracted from the fourth face image of the user in the second video stream to obtain a first facial feature. A facial feature is extracted from the first face image in the to-be-edited image to obtain a second facial feature. When the first facial feature matches the second facial feature, it is determined that the to-be-edited image includes the face image of the user. When the first facial feature does not match the second facial feature, it is determined that the to-be-edited image does not include the face image of the user.

Further, the first facial feature and the second facial feature are facial feature vectors. Facial feature extraction from the fourth face image of the user in the second video stream to obtain the first facial feature includes performing face detection and face key point positioning on the fourth face image of the user in the second video stream to obtain a first facial feature vector.

Extracting the facial feature from the first face image of the user in the to-be-edited image to obtain the second facial feature includes determining the first face image of the user in the to-be-edited image, and extracting the facial feature from the first face image of the user, to obtain a second facial feature vector.

Determining whether the first facial feature matches the second facial feature includes calculating a feature distance between the first facial feature vector and the second facial feature vector, and if the feature distance is less than a preset threshold, determining that the first facial feature matches the second facial feature, or if the feature distance is not less than a preset threshold, determining that the first facial feature does not match the second facial feature.

If it is determined that the to-be-edited image includes the face image of the user, step S404 is performed, or if it is determined that the to-be-edited image does not include the face image of the user, step S403 is performed.

It is determined that the to-be-edited image includes the face image of the user, so that the user is allowed to edit the face image only of the user, thereby avoiding ethical issues and public opinions.

S403: Prompt to reject editing a facial expression.

A second prompt message is displayed in the display interface of the electronic device, and the second prompt message prompts that an object edited by the user is not the user.

Step S410 is performed after S403 is performed.

S404: Determine whether to record a video of a facial expression editing process of the user.

Further, when it is determined that the to-be-edited image includes the face image of the user, a third prompt message is displayed in the display interface of the electronic device. The third prompt message prompts the user whether to record the video of the facial expression editing process of the user, and displays "yes" and "no" functional buttons. When it is detected that the user taps the "yes" functional button, recording the video of the facial expression editing process of the user is started, and steps S405 to S407 and S409 are performed. When it is detected that the user taps the "no" functional button, steps S405 to S408 are performed.

S405: Obtain, by using the camera, a first video stream including a second face image of the user, and edit the first face image in the to-be-edited image based on the second face image of the user in the first video stream to obtain a preliminarily edited image.

The preliminarily edited image includes a third face image of the user.

It should be noted herein that, when it is determined that the to-be-edited image includes the face image of the user, or when it is determined that the first face image of the user in the to-be-edited image is being edited, three areas in the display interface of the electronic device respectively display the to-be-edited image, the first video stream that is obtained by the camera in real time and that includes the second face image of the user, and an effect image obtained by editing the first face image of the user in the to-be-edited image in real time. An interface displaying an image that is obtained in real time and that includes the face of the user may be referred to as a preview interface.

Optionally, when the first video stream including the second face image of the user is obtained by using the camera, the electronic device prompts the user to adjust a status of the image of the user on the preview interface and a camera angle. For example, the user is prompted to change a distance between a head and a lens, or change a relative position between the head and the lens. For another example, the user is prompted to change a head posture, a light angle, or strength. For still another example, the user is prompted to remove an obstacle such as a hat, a mask, or glasses. Optionally, the user may be prompted by a text in the prompt message, or may be prompted by a voice.

The first video stream includes N images, and each of the N images includes the second face image of the user, where N is an integer greater than 1.

In a feasible embodiment, a face model may be expressed as follows:

$$V = s \cdot R \cdot (\bar{V} + A_{id} \cdot \text{Alpha\_id} + A_{exp} \cdot \text{Alpha\_exp}) + T,$$

where V indicates a 3D face model, $\bar{V}$ indicates an average 3D face model, or may be understood as a face model of an ordinary face, s indicates a size of a face, R indicates a rotation matrix or an Euler angle of a head posture of the 3D face, T indicates a translation vector required when a 3D head in a Cartesian coordinate system is mapped to an image coordinate system, $A_{id}$ is an expression orthogonal basis describing a face shape, $A_{exp}$ is an expression orthogonal basis describing a facial expression, Alpha_id is a vector describing the face shape, where the vector is not related to the head posture of the user, and the vector tends to be consistent for a same person in different expressions, Alpha_exp is a vector describing the facial expression, where the vector is not related to the head posture of the user, and the vector tends to be consistent for a same person in different expressions.

Further, face modeling is performed on the first face image of the user in the to-be-edited image based on a convolutional neural network to obtain a first face model of the user in the to-be-edited image. An expression coefficient of the first face model is (s_1, R_1, T_1, alpha_id_1, alpha_exp_1). Face modeling is performed on the second face image of the user in each of the N images based on the convolutional neural network to obtain a second face model of the user in each image. An expression coefficient of the second face model is (s_2, R_2i, T_2i, alpha_id_2i, alpha_exp_2i), i=1, 2, 3, ... , or N. Sums or weighted sums of the parameters alpha_id_1 and alpha_id_21, alpha_id_22, ... , and alpha_id_2N are calculated. Then, an average of the sums is calculated to obtain the first target parameter alpha_id_x, where:

alpha_id_x=(alpha_id_1+alpha_id_21+alpha_id_22+ ... +alpha_id_2N)/(N+1), or alpha_id_x=(w×alpha_id_1+w$_1$×alpha_id_21+w$_2$×alpha_id_22+ ... +w$_N$×alpha_id_2N)/(N+1), where w, w$_1$, w$_2$, ... , and w$_N$ are respectively weights of alpha_id_1, alpha_id_21, ... , alpha_id_22, and alpha_id_2N.

After the first target parameter alpha_id_x is determined, modeling is performed again on the first face image of the user in the to-be-edited image based on the first target parameter alpha_id_x, to obtain a new first face model. An expression coefficient of the model is (s_3, R_3, T_3, alpha_id_x, alpha_exp_3). Modeling is performed again on the second face image of the user in the first video stream based on the first target parameter alpha_id_x, to obtain a new second face model. An expression coefficient of the model is (s_4, R_4, T_4, alpha_id_x, alpha_exp_4). The target face model is built based on the first target parameter alpha_id_x, the second target parameter s_3, the third target parameter R_4, the fourth target parameter T_3 and the fifth target parameter alpha_exp_4. The target face model may be expressed as follows:

$$V' = s\_3 \cdot R\_3 \cdot (\bar{V} + A_{id} \cdot \text{Alpha\_id\_x} + A_{exp} \cdot \text{Alpha\_exp\_4}) + T\_3.$$

After the target face model is obtained, rendering and reconstruction are performed on the target face model to obtain the preliminarily edited image.

Performing rendering and reconstruction on the target face model to obtain the preliminarily edited image may further include performing projection rendering based on triangulation, a 3D vertex, and a vertex color or a texture image of the target face model, to obtain the preliminary edited image. Optionally, the texture image may be a UV map of the target face model.

S406: Obtain a feature image based on the first face image of the user in the to-be-edited image, the third face image of the user in the preliminarily edited image, and the second face image of the user in the first video stream.

Optionally, the feature image may include the image of an eye and an oral cavity of the user, and may further include an image of a part other than the eye and the oral cavity of the user, for example, an ear, a nose, or an eyebrow.

Further, image segmentation is separately performed on the first face image of the user in the to-be-edited image, the third face image of the user in the preliminarily edited image, and the second face image of the user in the first video stream, to obtain a first image, a second image, and a third image. The first image is an image that is in the to-be-edited image and that includes the eye and the oral cavity of the user. The second image is an image that is in the preliminarily edited image and that includes the eye and the oral cavity of the user. The third image is an image that is in the first video stream and that includes the eye and the oral cavity of the user. A feature of the eye and the oral cavity in the first image, the second image, and the third image is encoded to obtain a feature vector of the images of the eye and the oral cavity of the user. The image including the eye and the oral cavity of the user is obtained by performing deconvolution and upsampling on the feature vector.

S407: Fuse the feature image and the third face image of the user in the preliminarily edited image to obtain an edited image.

Optionally, compared with a facial expression of the user in the to-be-edited image, an expression of the user in the edited image is closer to a target expression of the user.

Further, the feature image and the preliminarily edited image are fused according to an image fusion algorithm to obtain the edited image. The edited image includes a first facial expression of the user, the second face image includes a second facial expression of the user, and the first facial expression is associated with the second facial expression.

Further, that the first facial expression is associated with the second facial expression includes the following.

The first facial expression is the second facial expression. Alternatively, a mean square error between a first vector and a second vector is less than a first threshold. The first vector is a vector indicating the first facial expression, and the second vector is a vector indicating the second facial expression.

Optionally, the first threshold may be 0.1, 0.2, 0.5, 0.7, or another value. The first threshold is 0.5.

It should be noted herein that the first vector and the second vector are alpha_exp in the expression coefficients of the face models.

S408: Store the edited image.

S409: Store a plurality of frames of image or all images in the video of the facial expression editing process of the user.

The plurality of frames of image or all the images include the edited image. Optionally, the plurality of frames of image in the video of the facial expression editing process of the user may be consecutive frames of image, and the consecutive frames of image may be considered as a video clip of the video of the facial expression editing process of the user. Alternatively, the plurality of frames of image in the video of the facial expression editing process of the user may not be consecutive frames of image, and the non-consecutive frames may also form a video clip.

The edited image may be stored in an image format such as JPG, PNG, BMP, or TIF.

The video or video clip may be stored in a format such as Graphics Interchange Format (GIF), Flash Video (FLV), or RealMedia Variable Bitrate (RMVB).

After the edited image or the video or the video clip of the facial expression editing process of the user is stored, the user may view the edited image or the video or the video clip of the facial expression editing process of the user in the album of the electronic device. When viewing the video or the video clip, the user can see beautification effect of a facial expression in a photo, and see unique effect in which everyone else in the photo remains unchanged and only the facial expression of the user is changing.

S410: Exit editing the facial expression.

It can be learned that in the solutions in embodiments of this disclosure, the user can only re-edit, by using facial recognition, a facial expression of the user, thereby avoiding ethical issues and public opinions. The first face image of the user in the to-be-edited image is re-edited based on the second face image of the user in the first video stream obtained by using the camera. A precise face model is built based on the to-be-edited image and the face image in the first video stream. A photo is re-edited based on the precise face model. Content that does not exist in an actual situation is not added to the photo. This can restore actual effect of the user's face, assist in beautification on a face image of the user, re-edit a facial expression of the user in the static photo based on the user's face image captured by using the camera in real time, implement an expression re-editing function, achieve more realistic effect, make an improvement in current 2D/3D beautification that only changes a skin color and a face contour in the industry, and improve user experience.

Figure 10:
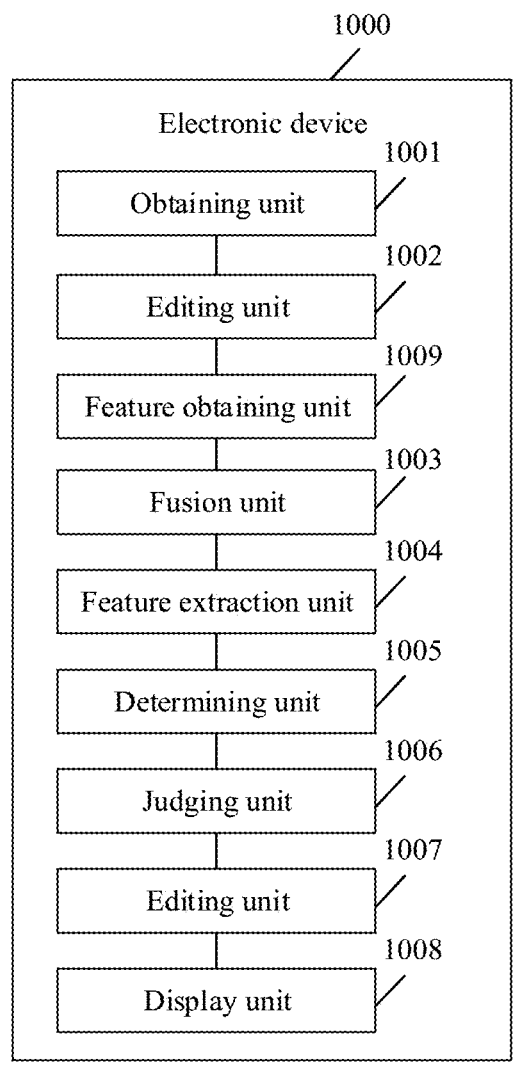
FIG. 10 is a schematic diagram of a structure of a second electronic device according to an embodiment of this disclosure.

FIG. 10 is a schematic diagram of a structure of a second electronic device according to an embodiment of this disclosure. As shown in FIG. 10, the electronic device 1000 includes an obtaining unit 1001 configured to obtain a to-be-edited image, where the to-be-edited image includes a first face image of a user, and obtain, by using a camera, a first video stream including a second face image of the user, an editing unit 1002 configured to edit the first face image of the user in the to-be-edited image based on the second face image of the user in the first video stream to obtain a preliminarily edited image, where the preliminarily edited image includes a third face image of the user, a feature obtaining unit 1009 configured to obtain a feature image based on the first face image of the user in the to-be-edited image, the third face image of the user in the preliminarily edited image, and the second face image of the user in the first video stream, where the feature image is an image including an eye and an oral cavity of the user, and a fusion unit 1003 configured to fuse the feature image and the third face image of the user in the preliminarily edited image to obtain an edited image, where the edited image includes a first facial expression of the user, the second face image includes a second facial expression of the user, and the first facial expression is associated with the second facial expression.

That the first facial expression is associated with the second facial expression further includes the following.

The first facial expression is the second facial expression. Alternatively, a mean square error between a first vector and a second vector is less than a first threshold. The first vector is a vector indicating the first facial expression, and the second vector is a vector indicating the second facial expression.

Optionally, the first threshold may be 0.1, 0.2, 0.5, 0.7, or another value. The first threshold is 0.5.

With reference to any one of the second aspect and the possible implementations of the second aspect, the editing unit 1002 is further configured to determine a first target parameter based on the second face image of the user in the first video stream and the first face image of the user in the to-be-edited image, where the first target parameter is a vector describing a face shape of the user, determine a second target parameter, a third target parameter, and a fourth target parameter based on the first target parameter and the to-be-edited image, where the second target parameter indicates a size of a face of the user, the third target parameter indicates a rotation matrix or an Euler angle of a head posture of a 3D face of the user, and the fourth target parameter indicates a translation vector required when a 3D head of the user in a Cartesian coordinate system is mapped to an image coordinate system, determine a fifth target parameter based on the first target parameter and the second face image of the user in the first video stream, where the fifth target parameter is a vector describing a facial expression of the user in the first video stream, build a target face model based on the first target parameter, the second target parameter, the third target parameter, the fourth target parameter, and the fifth target parameter, and perform rendering and reconstruction on the target face model to obtain the preliminarily edited image.

With reference to any one of the second aspect and the possible implementations of the second aspect, the first video stream includes N images, where N is an integer greater than 1. Each of the N images includes the second face image of the user. During determining the first target parameter based on the second face image of the user in the first video stream and the first face image of the user in the to-be-edited image, the editing unit 1002 is further configured to perform modeling on the second face image of the user in each of the N images to obtain a first parameter of each image, where the first parameter of each image is a vector describing a face shape of the user in each image, perform modeling on the first face image of the user in the to-be-edited image to obtain a second parameter of the to-be-edited image, where the second parameter is a vector describing a face shape of the user in the to-be-edited image, and determine the first target parameter based on the first parameter of each of the N images and the second parameter of the to-be-edited image.

With reference to any one of the second aspect and the possible implementations of the second aspect, the feature obtaining unit 1009 is further configured to separately perform image segmentation on the first face image of the user in the to-be-edited image, the third face image of the user in the preliminarily edited image, and the second face image of the user in the first video stream, to obtain a first image, a second image, and a third image, where the first image is an image that is in the to-be-edited image and that includes the eye and the oral cavity of the user, the second image is an image that is in the preliminarily edited image and that includes the eye and the oral cavity of the user, and the third image is an image that is in the first video stream and that includes the eye and the oral cavity of the user, encode a feature of the eye and the oral cavity in the first image, the second image, and the third image, to obtain a feature vector of the images of the eye and the oral cavity of the user, and generate the feature image based on the feature vector of the images of the eye and the oral cavity of the user.

With reference to any one of the second aspect and the possible implementations of the second aspect, before obtaining, by using the camera, the first video stream including the second face image of the user, the obtaining unit 1001 is further configured to obtain, by using the camera, a second video stream including a fourth face image of the user.

The electronic device 1000 further includes a feature extraction unit 1004 configured to extract a facial feature from the second face image of the user in the second video stream to obtain a first facial feature, and extract a facial feature from the first face image of the user in the to-be-edited image to obtain a second facial feature, and a determining unit 1005 configured to, when the first facial feature matches the second facial feature, obtain, by using the camera, the first video stream including the second face image of the user.

With reference to any one of the second aspect and the possible implementations of the second aspect, the electronic device 1000 further includes a judging unit 1006 configured to, when the camera is started to obtain the first video stream, determine whether to record a video of a facial expression editing process of the user, and a storage unit 1007 configured to, if the judging unit 1006 determines to record the video of the facial expression editing process of the user, store a plurality of frames of image or all images in the video of the facial expression editing process of the user after obtaining the edited image, where the plurality of frames of image or all the images include the edited image, or if the judging unit 1006 determines not to record the video of the facial expression editing process of the user, store the edited image after obtaining the edited image.

With reference to any one of the second aspect and the possible implementations of the second aspect, the electronic device 1000 further includes a display unit 1008 configured to display in real time the to-be-edited image, the first video stream, and an effect image obtained by editing the to-be-edited image in real time.

It should be noted that the foregoing units (the obtaining unit 1001, editing unit 1002, feature obtaining unit 1009, fusion unit 1003, feature extraction unit 1004, determining unit 1005, judging unit 1006, storage unit 1007, and display unit 1008) are configured to perform related steps in the foregoing method. For example, the obtaining unit 1001 is configured to perform related content of steps S301, S302, S401, and S405. The editing unit 1002 is configured to perform related content of steps S302 and S405. The feature extraction unit 1004 is configured to perform related content of steps S304 and S406. The fusion unit 1003 is configured to perform related content of steps S305 and S407. The feature extraction unit 1004, the determining unit 1005, and the judging unit 1006 are configured to perform related content of S303, S402, and S404. The determining unit, the judging unit, and the storage unit 1007 are configured to perform related content of steps S408 and S409. The display unit 1008 is configured to perform related content of step S305.

In this embodiment, the electronic device 1000 is presented in a form of a unit. The "unit" herein may be an application-specific integrated circuit (ASIC), a processor and a memory that execute one or more software or firmware programs, an integrated logic circuit, and/or another device that can provide the foregoing functions. In addition, the obtaining unit 1001, editing unit 1002, fusion unit 1003, feature extraction unit 1004, determining unit 1005, judging unit 1006, and storage unit 1007 may be implemented by using a processor 1201 of a fourth electronic device shown in FIG. 12.

Figure 11:
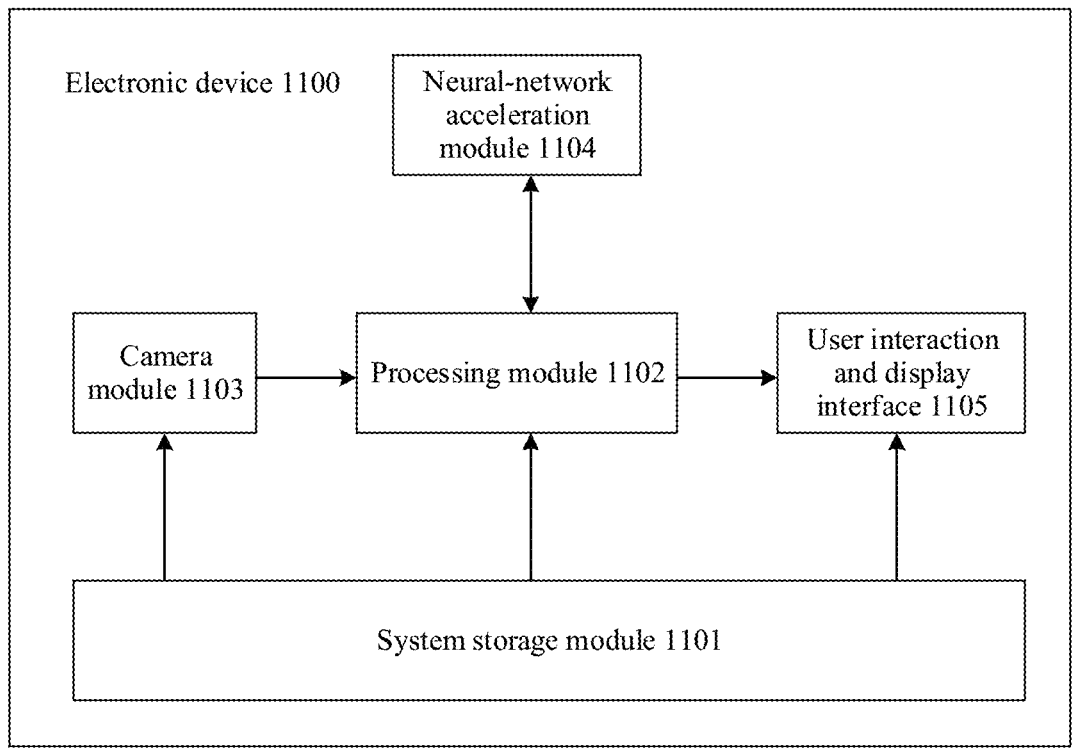
FIG. 11 is a schematic diagram of a structure of a third electronic device according to an embodiment of this disclosure.

FIG. 11 is a schematic diagram of a structure of a third electronic device according to an embodiment of this disclosure. As shown in FIG. 11, the electronic device 1100 includes the following.

The system storage module 1101 is configured to store a to-be-edited image, an edited image, and a first video stream and a second video stream that are obtained by using a camera module, and provide system storage overheads during running of another module. The to-be-edited image includes a first face image of a user. The first video stream includes a second face image of the user. The second video stream includes a fourth face image of the user.

A processing module 1102 is configured to determine whether the fourth image of the user in the second video stream and the first face image in the to-be-edited image are of a same person, when the fourth image of the user in the second video stream and the first face image in the to-be-edited image are of a same person, edit the first face image of the user in the to-be-edited image based on the second face image of the user in the first video stream to obtain a preliminarily edited image, where the preliminarily edited image includes a third face image of the user, obtain a feature image based on the first face image of the user in the to-be-edited image, the third face image of the user in the preliminarily edited image, and the second face image of the user in the first video stream, where the feature image is an image including an eye and an oral cavity of the user, and fuse the feature image and the preliminarily edited image to obtain an edited image. The edited image includes a first facial expression of the user, the second face image includes a second facial expression of the user, and the first facial expression is associated with the second facial expression. For a specific process, refer to related descriptions of the embodiment shown in FIG. 3 or FIG. 4. Details are not described herein again.

A camera module 1103 is configured to obtain the first video stream and the second video stream.

The neural-network acceleration module 1104 is configured to build, based on a convolutional neural network, a face model corresponding to the first face image of the user in the to-be-edited image and a face model corresponding to the second face image of the user in the first video stream, and obtain the feature image based on the first face image of the user in the to-be-edited image, the third face image of the user in the preliminarily edited image, and the second face image of the user in the first video stream. The feature image includes an image of the eye and the oral cavity of the user. For a specific process, refer to related descriptions of the embodiment shown in FIG. 3 or FIG. 4. Details are not described herein again.

A user interaction and display interface 1105 is configured to display the to-be-edited image, the first video stream obtained by using the camera module 1103 in real time, and an effect image obtained by editing the to-be-edited image in real time, and display related messages and functional buttons in the embodiment in FIG. 3 or FIG. 4, to implement interaction with the user.

Figure 12:
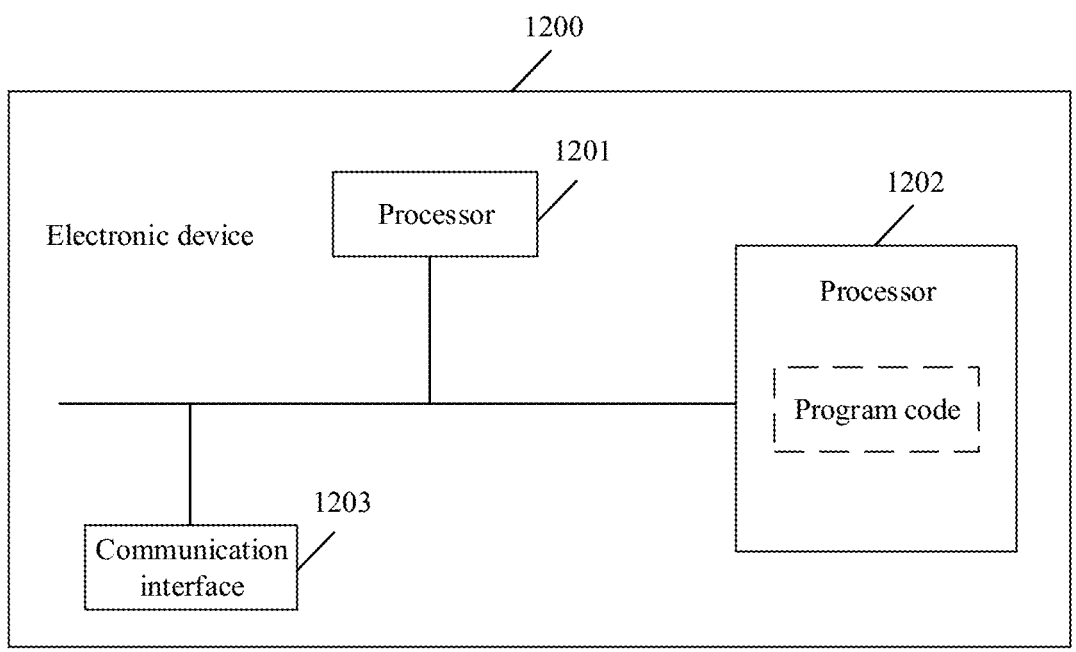
FIG. 12 is a schematic diagram of a structure of a fourth electronic device according to an embodiment of this disclosure.

As shown in FIG. 12, an electronic device 1200 may be implemented by using a structure in FIG. 12. The electronic device 1200 includes at least one processor 1201, at least one memory 1202, and at least one communication interface 1203. The processor 1201, the memory 1202, and the communication interface 1203 are connected and communicate with each other by using a communication bus.

The processor 1201 may be a general central processing unit (CPU), a microprocessor, an ASIC, or one or more integrated circuits for controlling execution of the foregoing solution program.

The communication interface 1203 is configured to communicate with another device or a communication network such as an Ethernet, a radio access network (RAN), or a WLAN.

The memory 1202 may be a read-only memory (ROM) or another type of static storage device that may store static information and instructions, or a RAM or another type of dynamic storage device that may store information and instructions, or may be an electrically erasable programmable ROM (EEPROM), a compact disc (CD) ROM (CD-ROM), another optical disc storage medium, optical disc storage medium (including a CD, a laser disc, an optical disc, a DIGITAL VERSATILE DISC (DVD), a BLU-RAY disc, or the like), or magnetic disc storage medium, another magnetic storage device, or any other medium that can carry or store expected program code in a structural form of an instruction or data and that can be accessed by a computer, but is not limited thereto. The memory may exist independently, and is connected to the processor through the bus. The memory may alternatively be integrated with the processor.

The memory 1202 is configured to store application code for executing the foregoing solutions, and the processor 501 controls the execution. The processor 1201 is configured to execute the application code stored in the memory 1202.

Code stored in the memory 1202 may be executed to perform the foregoing facial expression editing method, for example, obtaining a to-be-edited image, where the to-be-edited image includes a first face image of a user, obtaining, by using a camera, a first video stream including a second face image of the user, editing the first face image of the user in the to-be-edited image based on the second face image of the user in the first video stream to obtain a preliminarily edited image, where the preliminarily edited image includes a third face image of the user, obtaining a feature image based on the first face image of the user in the to-be-edited image, the third face image of the user in the preliminarily edited image, and the second face image of the user in the first video stream, where the feature image is an image including an eye and an oral cavity of the user, and fusing the feature image and the third face image in the preliminarily edited image to obtain an edited image. The edited image includes a first facial expression of the user, the second face image includes a second facial expression of the user, and the first facial expression is associated with the second facial expression.

Embodiments of this disclosure further provide a computer storage medium. The computer storage medium may store a program. When the program is executed, some or all of the steps of any facial expression editing method in the foregoing method embodiments may be performed.

It should be noted that, for brief description, the foregoing method embodiments are represented as a series of actions. However, a person skilled in the art should appreciate that this disclosure is not limited to the described order of the actions, because according to this disclosure, some steps may be performed in other orders or simultaneously. It should be further appreciated by a person skilled in the art that embodiments described in this specification all belong to example embodiments, and the involved actions and modules are not necessarily required by this disclosure.

In the foregoing embodiments, the description of each embodiment has respective focuses. For a part that is not described in detail in an embodiment, refer to related descriptions in other embodiments.

In the several embodiments provided in this disclosure, it should be understood that the disclosed apparatus may be implemented in other manners. For example, the described apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this disclosure may be integrated into one processing unit, each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable memory. Based on such an understanding, the technical solutions of this disclosure essentially, or the part contributing to the conventional technology, or all or some of the technical solutions may be implemented in the form of a software product. The software product is stored in a memory and includes several instructions for instructing a computer device (which may be a personal computer, a server, or a network device) to perform all or some of the steps of the methods described in embodiments of this disclosure. The foregoing memory includes any medium that can store program code, such as a USB flash drive, a ROM, a RAM, a removable hard disk, a magnetic disk, or an optical disc.

A person of ordinary skill in the art may understand that all or some of the steps of the methods in embodiments may be implemented by a program instructing related hardware. The program may be stored in a computer-readable memory. The memory may include a flash memory, a ROM, a RAM, a magnetic disk, an optical disc, or the like.

In conclusion, the foregoing embodiments are merely intended for describing the technical solutions of this disclosure, but not for limiting this disclosure. Although this disclosure is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this disclosure.

What is claimed is:

1. A method comprising:
obtaining a to-be-edited image comprising a first face image of a user;
obtaining a first video stream comprising a second face image of the user, wherein the second face image comprises a second facial expression of the user;
editing the first face image based on the second face image to obtain a preliminarily edited image, wherein the preliminarily edited image comprises a third face image of the user;
obtaining a feature image based on the first face image, the third face image, and the second face image, wherein the feature image comprises an eye of the user and an oral cavity of the user; and
fusing the feature image and the third face image to obtain an edited image, wherein the edited image comprises a first facial expression of the user, and wherein the first facial expression is associated with the second facial expression when a mean square error between a first vector that indicates the first facial expression and a second vector that indicates the second facial expression is less than a first threshold.

2. The method of claim 1, wherein the first video stream further comprises a plurality of image frames, wherein the method further comprises further editing the first face image based on the second face image in the image frames, and wherein each of the image frames comprises the second face image.

3. The method of claim 1, further comprising:
obtaining, using a camera, the first video stream;
receiving the first video stream from an external device; or
retrieving a stored first video stream comprising the second face image.

4. The method of claim 1, further comprising:
determining a first target parameter based on the second face image and the first face image, wherein the first target parameter is a first vector describing a face shape of the user;
determining a second target parameter, a third target parameter, and a fourth target parameter based on the first target parameter and the to-be-edited image, wherein the second target parameter indicates a size of a face of the user, wherein the third target parameter indicates a rotation matrix or a Euler angle of a head posture of a three-dimensional (3D) face of the user, and wherein the fourth target parameter indicates a translation vector required when a 3D head of the user in a Cartesian coordinate system is mapped to an image coordinate system;
determining a fifth target parameter based on the first target parameter and the second face image, wherein the fifth target parameter is a second vector describing a third facial expression of the user in the first video stream;
building a target face model based on the first target parameter, the second target parameter, the third target parameter, the fourth target parameter, and the fifth target parameter; and
performing rendering and reconstruction on the target face model to obtain the preliminarily edited image.

5. A method comprising:
displaying a to-be-edited image in a display interface of a first device, wherein the to-be-edited image comprises a first face image of a user;
receiving a first operation in the display interface;
obtaining a first video stream comprising a second face image of the user;
obtaining a target image from the first video stream, wherein the target image comprises a target expression of the user;
editing the to-be-edited image based on the target image to obtain an edited image, wherein a first facial expression of the user in the edited image is closer to the target expression than a second facial expression of the user in the to-be-edited image when a mean square error between a first vector that indicates the first facial expression and a second vector that indicates the second facial expression is less than a first threshold; and
displaying the edited image in the display interface.

6. The method of claim 5, wherein the first operation comprises one or more of sliding, tapping, dragging, or inputting.

7. The method of claim 5, wherein the first video stream comprises a plurality of image frames, wherein the method further comprises editing the first face image based on the second face image that is in the image frames, and wherein each of the image frames comprises the second face image.

8. The method of claim 5, further comprising:
obtaining, using a camera, the first video stream;
receiving the first video stream from an external device; or
retrieving a stored first video stream comprising the second face image.

9. The method of claim 5, wherein the second face image comprises a third facial expression of the user, and wherein the method further comprises identifying that the first facial expression is associated with the third facial expression when:
the first facial expression is the third facial expression; or
a mean square error between a third vector that indicates the first facial expression and a fourth vector that indicates the third facial expression is less than a second threshold.

10. The method of claim 5, further comprising:
determining a first target parameter based on the second face image and the first face image, wherein the first target parameter is a first vector describing a face shape of the user;
determining a second target parameter, a third target parameter, and a fourth target parameter based on the first target parameter and the to-be-edited image, wherein the second target parameter indicates a size of a face of the user, wherein the third target parameter indicates a rotation matrix or a Euler angle of a head posture of a three-dimensional (3D) face of the user, and wherein the fourth target parameter indicates a translation vector required when a 3D head of the user in a Cartesian coordinate system is mapped to an image coordinate system;
determining a fifth target parameter based on the first target parameter and the second face image, wherein the fifth target parameter is a second vector describing a third facial expression of the user in the first video stream;
building a target face model based on the first target parameter, the second target parameter, the third target parameter, the fourth target parameter, and the fifth target parameter; and
performing rendering and reconstruction on the target face model to obtain a preliminarily edited image.

11. The method of claim 10, wherein the preliminarily edited image comprises a third face image, and wherein the method further comprises:
   separately performing image segmentation on the first face image, the third face image, and the second face image to obtain a first image, a second image, and a third image, wherein the first image is in the to-be-edited image and comprises an eye of the user and an oral cavity of the user, wherein the second image is in the preliminarily edited image and comprises the eye and the oral cavity, and wherein the third image is in the first video stream and comprises the eye and the oral cavity;
   encoding a feature of the eye and the oral cavity in each of the first image, the second image, and the third image to obtain a feature vector of images of the eye and the oral cavity; and
   generating a feature image based on the feature vector.

12. The method claim 5, further comprising:
   obtaining, using a camera, a second video stream comprising a third face image of the user;
   extracting a first facial feature from the third face image;
   extracting a second facial feature from the first face image; and
   obtaining, using the camera, the first video stream when the first facial feature matches the second facial feature.

13. An electronic device comprising:
   a memory configured to store instructions; and
   one or more processors coupled to the memory and configured to execute the instructions to cause the electronic device to:
      obtain a to-be-edited image comprising a first face image of a user;
      obtain a first video stream comprising a second face image of the user, wherein the second face image comprises a second facial expression of the user;
      edit the first face image based on the second face image to obtain a preliminarily edited image, wherein the preliminarily edited image comprises a third face image of the user;
      obtain a feature image based on the first face image, the third face image, and the second face image, wherein the feature image comprises an eye of the user and an oral cavity of the user; and
      fuse the feature image and the third face image to obtain an edited image,
      wherein the edited image comprises a first facial expression of the user, and
      wherein the first facial expression is associated with the second facial expression when a mean square error between a first vector that indicates the first facial expression and a second vector that indicates the second facial expression is less than a first threshold.

14. The electronic device of claim 13, wherein the first video stream comprises a plurality of image frames, wherein the one or more processors is further configured to execute the instructions to cause the electronic device to further edit the first face image based on the second face image in the image frames, and wherein each of the image frames comprises the second face image.

15. The electronic device of claim 13, wherein the one or more processors is further configured to execute the instructions to cause the electronic device to:
   obtain, using a camera, the first video stream;
   receive the first video stream from an external device; or
   retrieve a stored first video stream comprising the second face image.

16. The electronic device of claim 13, wherein the one or more processors is further configured to execute the instructions to cause the electronic device to:
   determine a first target parameter based on the second face image and the first face image, wherein the first target parameter is a first vector describing a face shape of the user;
   determine a second target parameter, a third target parameter, and a fourth target parameter based on the first target parameter and the to-be-edited image, wherein the second target parameter indicates a size of a face of the user, wherein the third target parameter indicates a rotation matrix or an Euler angle of a head posture of a three-dimensional (3D) face of the user, and wherein the fourth target parameter indicates a translation vector required when a 3D head of the user in a Cartesian coordinate system is mapped to an image coordinate system;
   determine a fifth target parameter based on the first target parameter and the second face image, wherein the fifth target parameter is a second vector describing a third facial expression of the user in the first video stream;
   build a target face model based on the first target parameter, the second target parameter, the third target parameter, the fourth target parameter, and the fifth target parameter; and
   perform rendering and reconstruction on the target face model to obtain the preliminarily edited image.

17. The electronic device of claim 13, wherein the one or more processors is further configured to execute the instructions to cause the electronic device to:
   edit the to-be-edited image in real time to obtain an effect image; and
   display, in real time, the to-be-edited image, the first video stream, and the effect image.

18. A computer program product comprising computer-executable instructions that are stored on a non-transitory computer-readable medium and that, when executed by one or more processors, cause an apparatus to:
   obtain a to-be-edited image comprising a first face image of a user;
   obtain a first video stream comprising a second face image of the user, wherein the second face image comprises a second facial expression of the user;
   edit the first face image based on the second face image to obtain a preliminarily edited image, wherein the preliminarily edited image comprises a third face image of the user;
   obtain a feature image based on the first face image, the third face image, and the second face image, wherein the feature image comprises an eye of the user and an oral cavity of the user; and
   fuse the feature image and the third face image to obtain an edited image, wherein the edited image comprises a first facial expression of the user, and wherein the first facial expression is associated with the second facial expression when a mean square error between a first vector that indicates the first facial expression and a second vector that indicates the second facial expression is less than a first threshold.

19. The computer program product of claim 18, wherein the first video stream further comprises a plurality of image frames, wherein the instructions, when executed by the one or more processors, cause the apparatus to further edit the first face image based on the second face image in the image frames, and wherein each of the image frames comprises the second face image.

20. The computer program product of claim 18, wherein the instructions, when executed by the one or more processors, further cause the apparatus to:
- obtain, using a camera, the first video stream;
- receive the first video stream from an external device; or
- retrieve a stored first video stream comprising the second face image.

\* \* \* \* \*